(12) United States Patent
Perriello

(10) Patent No.: US 6,244,346 B1
(45) Date of Patent: Jun. 12, 2001

(54) METHOD AND APPARATUS FOR REDUCING FOULING OF INJECTION AND RECOVERY WELLS

(75) Inventor: Felix Anthony Perriello, Norwood, MA (US)

(73) Assignee: Global BioSciences, Inc., North Attleborough, MA (US)

( * ) Notice: Subject to any disclaimer, the term of this patent is extended or adjusted under 35 U.S.C. 154(b) by 0 days.

(21) Appl. No.: 09/293,088

(22) Filed: Apr. 16, 1999

Related U.S. Application Data

(63) Continuation-in-part of application No. 09/275,320, filed on Mar. 24, 1999, which is a continuation-in-part of application No. 08/767,750, filed on Dec. 17, 1996, now Pat. No. 5,888,396.

(51) Int. Cl.[7] .................................................. E21B 37/06
(52) U.S. Cl. ........................... 166/304; 166/246; 166/312; 166/403; 210/747
(58) Field of Search ................................... 166/304, 312, 166/311, 246, 279, 268, 401, 403; 210/610, 611, 747

(56) References Cited

U.S. PATENT DOCUMENTS

| | | |
|---|---|---|
| 3,616,216 * | 10/1971 | Wegner ................................. 195/28 |
| 4,713,343 | 12/1987 | Wilson, Jr. et al. . |
| 5,037,551 | 8/1991 | Barkley et al. . |
| 5,057,221 | 10/1991 | Bryant et al. . |
| 5,316,940 | 5/1994 | Georgiou et al. . |
| 5,326,703 | 7/1994 | Hazen et al. . |
| 5,337,820 * | 8/1994 | Jenneman et al. .................... 166/246 |
| 5,342,769 | 8/1994 | Hunter et al. . |
| 5,384,048 | 1/1995 | Hazen et al. . |
| 5,441,887 | 8/1995 | Hanson et al. . |
| 5,678,632 * | 10/1997 | Moses et al. ......................... 166/307 |
| 5,814,514 | 9/1998 | Steffan et al. . |

OTHER PUBLICATIONS

Broholm et al., "Toxicity of 1,1,1–Trichloroethane and Trichloroethene on a Mixed Culture of Methane–Oxidizing Bacteria", *Applied and Environmental Microbiology*, vol. 56, No. 8, (Aug. 1990), p. 2488–2493.

"Petroleum", *Van Nostrand's Scientific Encyclopedia*, Eighth Edition, (1995) pp. 2392–2395, Douglas M. Considine, editor.

* cited by examiner

*Primary Examiner*—William Neuder
*Assistant Examiner*—Zakiya Walker
(74) *Attorney, Agent, or Firm*—Alan G. Towner; Eckert Seamans Cherin & Mellott, LLC

(57) ABSTRACT

A method and apparatus are disclosed in which alkane-utilizing bacteria are used to reduce fouling of injection and recovery wells. Fouling materials such as combinations of bacteria and metal oxides that would otherwise clog the wells are prevented from depositing on the wells. In a preferred embodiment, a butane substrate and an oxygen-containing gas are injected near a well inlet or outlet to stimulate the growth of butane-utilizing bacteria which are effective at reducing or eliminating fouling of the well.

47 Claims, 10 Drawing Sheets

METHOD AND APPARATUS FOR REDUCING FOULING OF INJECTION AND RECOVERY WELLS

CROSS-REFERENCE TO RELATED APPLICATION

This application is a continuation-in-part of U.S. patent application Ser. No. 09/275,320 filed Mar. 24, 1999, which is a continuation-in-part of U.S. patent application Ser. No. 08/767,750 filed Dec. 17, 1996, now U.S. Pat. No. 5,888,396, which are incorporated herein by reference.

FIELD OF THE INVENTION

The present invention relates to anti-fouling of injection and recovery wells, and more particularly relates to a method and apparatus for reducing or eliminating fouling of injection and recovery wells with alkane-utilizing bacteria.

BACKGROUND INFORMATION

Many different types of injection wells and recovery wells are widely used. Typical injection wells are used for water supply, groundwater control, solution mining, waste disposal, geothermal energy and to increase oil production. Typical recovery wells are used for groundwater control, capture and treatment, municipal water supplies, domestic water supplies and in the oil and geothermal industries.

Fouling at injection and recovery wells is a major problem worldwide. Chemical and biological incrustation are major causes of decreased well performance and eventual failure. Material comprising bacteria and metal oxides accumulates and clogs the wells. Iron and manganese fouling at well screens is a global problem for water supply and production wells. In addition, metals fouling is a problem at most wastewater treatment plants. For example, iron and manganese bacteria occur widely in wells open to the atmosphere when sufficient iron and/or manganese are present in the groundwater. Such bacteria plug wells by enzymatically catalyzing the oxidation of metals, using the energy to promote the growth of threadlike slimes, and accumulating large amounts of metal hydroxides, such as ferric hydroxide, in the slime. For instance, the bacteria may obtain their energy by oxidizing ferrous ions to ferric ions, which are then precipitated as hydrated ferric hydroxide on or in their mucilaginous sheaths. Iron bacteria produce accumulations of slimy material that have a gelatinous consistency. In addition, they precipitate dissolved iron and manganese. The dual effect of the growing bacteria and precipitating minerals occurs. Precipitation of the iron and rapid growth of the bacteria create a voluminous material that quickly plugs the screen pores of the sediment surrounding the well bore. The explosive growth rates of iron bacteria can render a well useless within a matter of months.

Other forms of iron bacteria induce the precipitation of iron through nonenzymatic means. These bacteria promote precipitation by mechanisms such as: raising pH; changing the redox potential of the water by algal photosynthesis; and liberating chelated iron. Some forms of iron bacteria can reduce iron to a ferrous state under anaerobic conditions.

A conventional method for reducing the amount of iron incrusting materials reaching production well screens, called the Vyredox System, uses a series of injection wells located in a circle around a production well. Oxygenated water is injected into the wells to oxidize iron in solution and promote the growth of iron bacteria so that little iron reaches the production well.

In many wells, incrusting iron cannot be removed before reaching a production well. In these cases, caustic chemicals are added to the well to clear biofouling and free the production well screen. These practices are costly, time consuming and require the production well to be brought off-line, thus disrupting service. Furthermore, the chemicals and their toxic fumes may cause serious injury to the technicians injecting them into the production well.

Other methods conventionally used to control iron bacteria are heat, explosives, ultrasonics, radiation and anoxic blocks.

Despite the above-noted efforts, need exists for the effective reduction or elimination of fouling at various types of injection and recovery wells. The present invention has been developed in view of the foregoing, and to remedy other deficiencies of the prior art.

SUMMARY OF THE INVENTION

In accordance with the present-invention, a method and apparatus are provided for anti-fouling of well inlets and outlets. Alkanes such as a butane substrate are used in combination with oxygen to stimulate the growth of microorganisms near the well inlets and/or outlets. The present alkane/oxygen injection method is a simple and cost effective treatment process to abate and prevent metal fouling at wellheads and other industrial applications by oxidizing dissolved metal concentrations and immobilizing them from the production and supply routes.

An aspect of the present invention is to provide a method of reducing well fouling. The method includes the steps of stimulating growth of alkane-utilizing bacteria adjacent to the well, and reducing the deposition of fouling material on the well with the alkane-utilizing bacteria.

Another aspect of the present invention is to provide a method of reducing well fouling, including the steps of introducing at least one alkane and oxygen to a region of the well susceptible to fouling, and stimulating growth of alkane-utilizing bacteria which reduce the deposition of fouling material on the well.

Another aspect of the present invention is to provide an apparatus for reducing well fouling. The apparatus includes a source of a butane substrate, a source of an oxygen-containing gas, and at least one injector in flow communication with the source of butane substrate and the source of oxygen-containing gas having a distal end located in proximity to at least a portion of the well that is susceptible to fouling.

These and other aspects of the present invention will become more apparent from the following description.

DETAILED DESCRIPTION OF THE PREFERRED EMBODIMENTS

Figure 1:
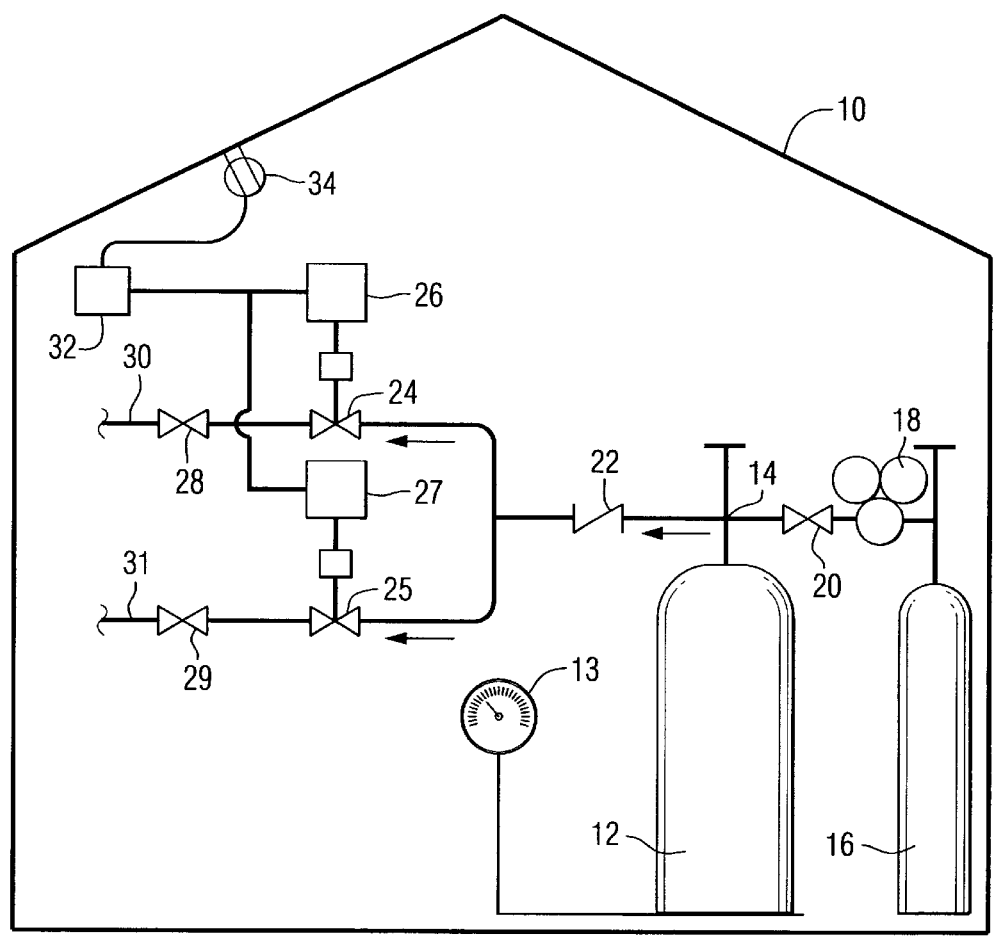
FIG. 1 is a schematic illustration of an in-situ butane injection system which may be used for reducing or eliminating fouling of injection or recovery wells in accordance with an embodiment of the present invention.

The present invention relates to a method and apparatus for reducing or eliminating fouling of injection and recovery wells. An alkane substrate and an oxygen-containing gas are injected into a well site to stimulate the growth of microorganisms which act to reduce or eliminate fouling at well inlets and/or outlets.

In accordance with the present invention, alkanes are used to stimulate the growth of alkane-utilizing bacteria which are effective in reducing or eliminating fouling of injection and recovery wells. Suitable alkane substrates include methane, ethane, propane, butane and mixtures thereof. For example, natural gas may be used as the alkane source. Alkanes and mixtures thereof having relatively high water solubility are preferred for many applications. Preferably, the solubility of the alkanes in water at 17° C. is greater than about 5 ml per 100 ml of water, more preferably greater than about 10 ml per 100 ml of water. Butane is a particularly preferred alkane for use in accordance with the present invention. The butane may be provided in the form of a butane substrate.

As used herein, the term "butane substrate" includes liquids and gases in which butane is present in sufficient amounts to stimulate substantial growth of butane-utilizing bacteria. Butane is preferably the most prevalent compound of the butane substrate on a weight percent basis, and typically comprises at least about 10 weight percent of the butane substrate. The other constituents of the butane substrate may include any suitable compounds, including inert gases and/or other alkanes such as methane, ethane and propane. The butane substrate preferably comprises at least about 50 weight percent butane. More preferably, the butane substrate comprises at least about 90 weight percent butane. In a particular embodiment, the butane substrate comprises at least about 99 weight percent n-butane. The butane may contain straight (n-butane) and/or branched chain compounds. While the use of a butane substrate is primarily described herein, it is to be understood that the use of other alkanes, alone or in combination, is within the scope of the present invention.

As used herein, the term "oxygen-containing gas" means gases which comprise oxygen, including pure oxygen as well as mixtures of oxygen with other gases. For example, the oxygen-containing gas may comprise air, pure oxygen, or oxygen blended with inert gases such as helium, argon, nitrogen, carbon monoxide or the like.

As used herein, the term "well" means any injection or recovery structure that may experience fouling during operation. Typical injection wells are used for water supply, groundwater control, solution mining, waste disposal, geothermal energy and to increase oil production. Typical recovery wells are used for groundwater control, capture and treatment, municipal water supplies, domestic water supplies and in the oil and geothermal industries.

As used herein, the term "fouling" means the deposition of fouling material on at least a portion of a well. Fouling can result in well clogging and failure due to the growth of, e.g., iron and manganese bacteria, including oxide and hydroxide deposition and incrustation caused by the activities of the iron and manganese bacteria.

The term "fouling material" means a material comprising bacteria and metal oxides (including hydroxides). The metal component of the fouling material may include, e.g., iron, manganese, lead, arsenic, nickel, mercury, molybdenum, cadmium, copper, chromium, silver, zinc and potassium. As a particular example of the formation of a fouling material, iron bacteria, such as Crenothrix, Leptothrix, Gallionella, Clonothrix, and Pseudomonas, can change dissolved iron to insoluble ferric iron, which is subsequently deposited in the sheaths of the bacterial cells. The sheaths create a gellike slime that eventually clog well screen slots.

The phenomenon of well screen fouling may be caused by iron and manganese bacteria, and the incrustations they deposit on the well screens. The fouling is caused when the solubility of iron and manganese changes due to, e.g., microbial activities, pressure reduction, pH fluctuations and other chemical and physical alterations. The following equations depict the chemical and solubility changes that lead up to well screen incrustation.

$$Fe(HCO_3)_2 = Fe(OH)_2 + 2CO_2$$

Solubility of ferrous hydroxide ($Fe(OH)_2$) is less than 20 mg/l (ppm).

$$4Fe(OH)_2 + 2H_2O + O_2 = 4Fe(OH)_3$$

Solubility of ferric hydroxide ($4Fe(OH)_3$) is less than 0.01 mg/l.

Further oxidation of the hydroxides of iron and manganese causes the formation of hydrated oxides. Ferrous iron in solution can react with oxygen to form ferric oxide.

Soluble manganese becomes insoluble in the same manner as iron.

$$2Mn(HCO_3)_2 + O_2 + 2H_2O = 2Mn(OH)_4 + 4CO_2$$

Processes that may be used in accordance with the present invention include the use of indigenous alkane-utilizing microorganisms and/or the injection of non-indigenous alkane-utilizing microorganisms into the well treatment area. Preferably, indigenous microorganisms are be stimulated to flourish by the addition of the butane substrate, oxygen-containing gas and, optionally, bacterial nutrients that may be limited in the system under scrutiny. Suitable bacterial nutrients include nitrogen-containing compounds and phosphorous-containing compounds. For example, the bacterial nutrients may comprise ammonia, nitrate, ammonium chloride and sodium orthophosphate salts, and combinations thereof.

FIG. 1 schematically illustrates an in-situ butane injection system in which fouling of injection and recovery wells may be substantially reduced in accordance with an embodiment of the present invention. The butane injection system is contained within a shed which houses a butane cylinder 12. The butane cylinder 12 rests on a scale 13 which is used to measure the amount of butane contained within the cylinder 12. The cylinder 12 is connected to a dual port valve 14. A helium cylinder 16 is also contained within the shed 10. The helium cylinder 16 is connected through a regulator 18 and a gate valve 20 to the dual port valve 14. A check valve 22 is positioned between a single line from the butane cylinder 12 and two branched lines leading to solenoid valves 24 and 25. A digital timer 26 controls the solenoid valve 24, while another digital timer 27 controls the solenoid valve 25. Gate valves 28 and 29 are positioned downstream from the solenoid valves 24 and 25, respectively. The gate valve 28 communicates with a butane injection well line 30. The gate valve 29 communicates with another butane injection well line 31. A power reset assembly 32 is connected between the digital timers 26 and 27 and an electrical power source 34 such as a GFCI receptacle (120 VAC).

The flow of the butane substrate from the cylinder 12 through the butane injection well lines 30 and 31 is controlled by the in-situ butane injection system shown in FIG. 1. The flow of the butane substrate to the injection well lines 30 and 31 may be constant or may be pulsed. In one embodiment, the butane substrate is supplied periodically to the lines 30 and 31 at desired intervals. For example, butane pulses may be supplied from 0.01 second to several minutes per hour at any suitable flow rate.

Figure 2:
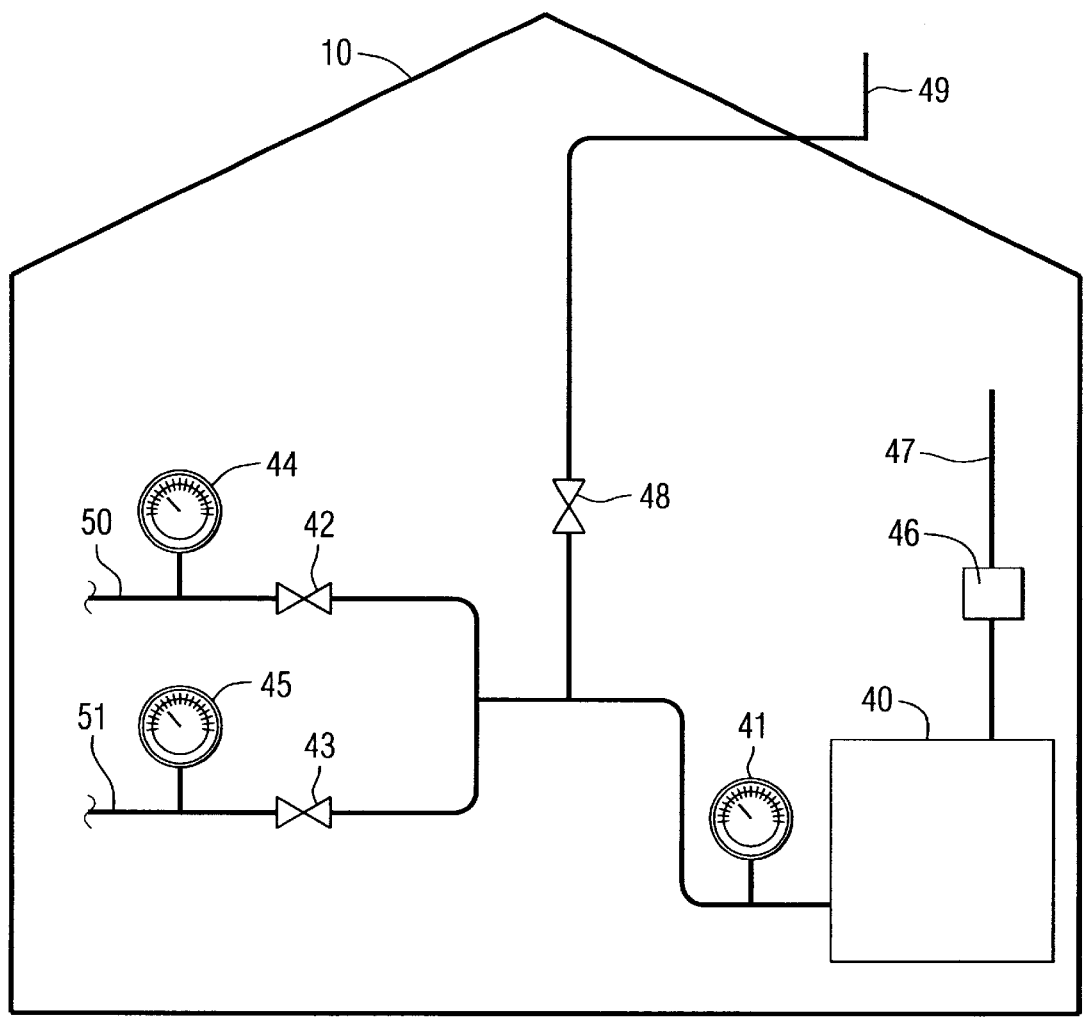
FIG. 2 is a schematic illustration of an in-situ air injection system which may be used for reducing or eliminating fouling of injection or recovery wells in accordance with an embodiment of the present invention.

FIG. 2 schematically illustrates an in-situ air injection system in which fouling of injection and recovery wells may be substantially reduced in accordance with an embodiment of the present invention. The air injection system is housed within the shed 10. An air compressor 40 supplies air through a system gauge 41 to gate valves 42 and 43. A flow gauge 44 is located downstream from the gate valve 42, while another flow gauge 45 is located downstream from the gate valve 43. The air compressor 40 is electrically connected through a fuse panel disconnect system 46 to an electrical power supply 47 such as a 220 volt AC power supply. A dilution valve 48 is connected to the line between the system gauge and the gate valves 42 and 43. The dilution valve 48 is connected to a vent 49. An air injection well line 50 communicates with the gate valve 42, while another air injection well line 51 communicates with the gate valve 43. The gate valves 42 and 43 are used to equalize the air flow to each of the air injection well lines 50 and 51.

The flow of air from the compressor 40 through the air injection well lines 50 and 51 is controlled by the in-situ air injection system shown in FIG. 2. The flow of air or other types of oxygen-containing gases to the injection well lines 50 and 51 may be constant or may be pulsed. The oxygen-containing gas may be supplied periodically to the lines 50 and 51 at desired intervals. For example, air may be supplied from 0.1 second to 50 minutes per hour at any suitable flow rate.

Figure 3:
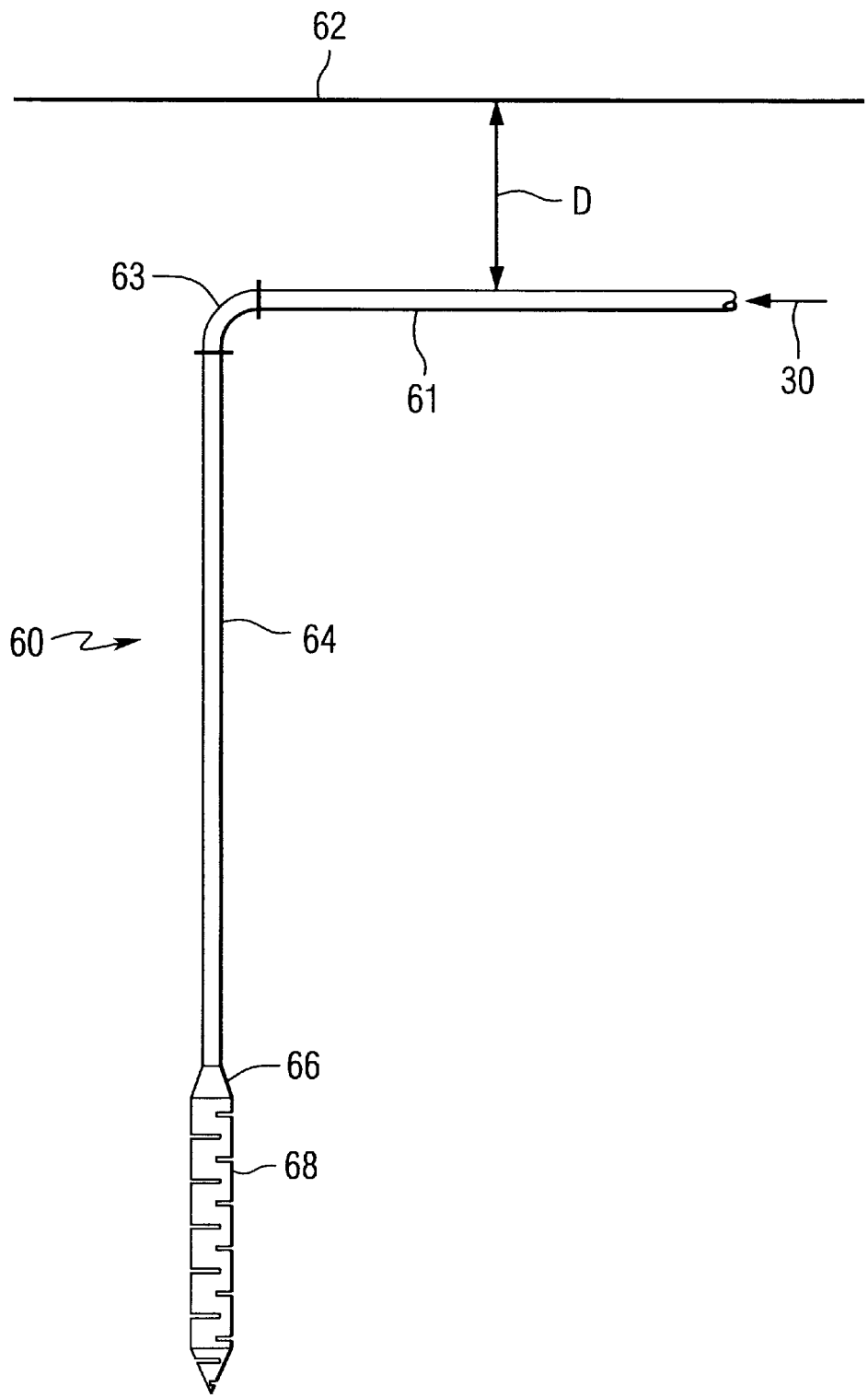
FIG. 3 is a partially schematic illustration of a butane injection well which may be used for reducing or eliminating fouling of injection or recovery wells in accordance with an embodiment of the present invention.

FIG. 3 illustrates a butane injection well 60 that may be used to prevent fouling in accordance with an embodiment of the present invention. The butane well injection line 30 shown in FIG. 1 is connected to the butane injection well 60 by a horizontal pipe 61 which is positioned a distance D below finish grade 62. The distance D is preferably at least 3 feet. The horizontal pipe 61 is connected by an elbow 63 to a vertical pipe 64. The vertical pipe 64 may have any suitable diameter and length. For example, the vertical pipe 64 may comprise a 1 inch outside diameter iron pipe having a length of from about 1 to about 100 or 500 feet or more. A fitting 66 is connected to the end of the vertical pipe 64. For example, the fitting 66 may be a 1 inch by 1¼ inch increaser fitting. A well point 68 is connected to the distal end of the vertical pipe 64 by the fitting 66. The well point 68 may be of any suitable construction which adequately permits dispersion of the butane into the treatment site. For example, the well point 68 may comprise a slotted stainless steel tube having an outside diameter of 1¼ inch and a length of 2 feet. Butane supplied from the butane injection well line 30 to the butane injection well 60 is introduced via the well point 68 into the treatment site at the desired location.

Figure 4:
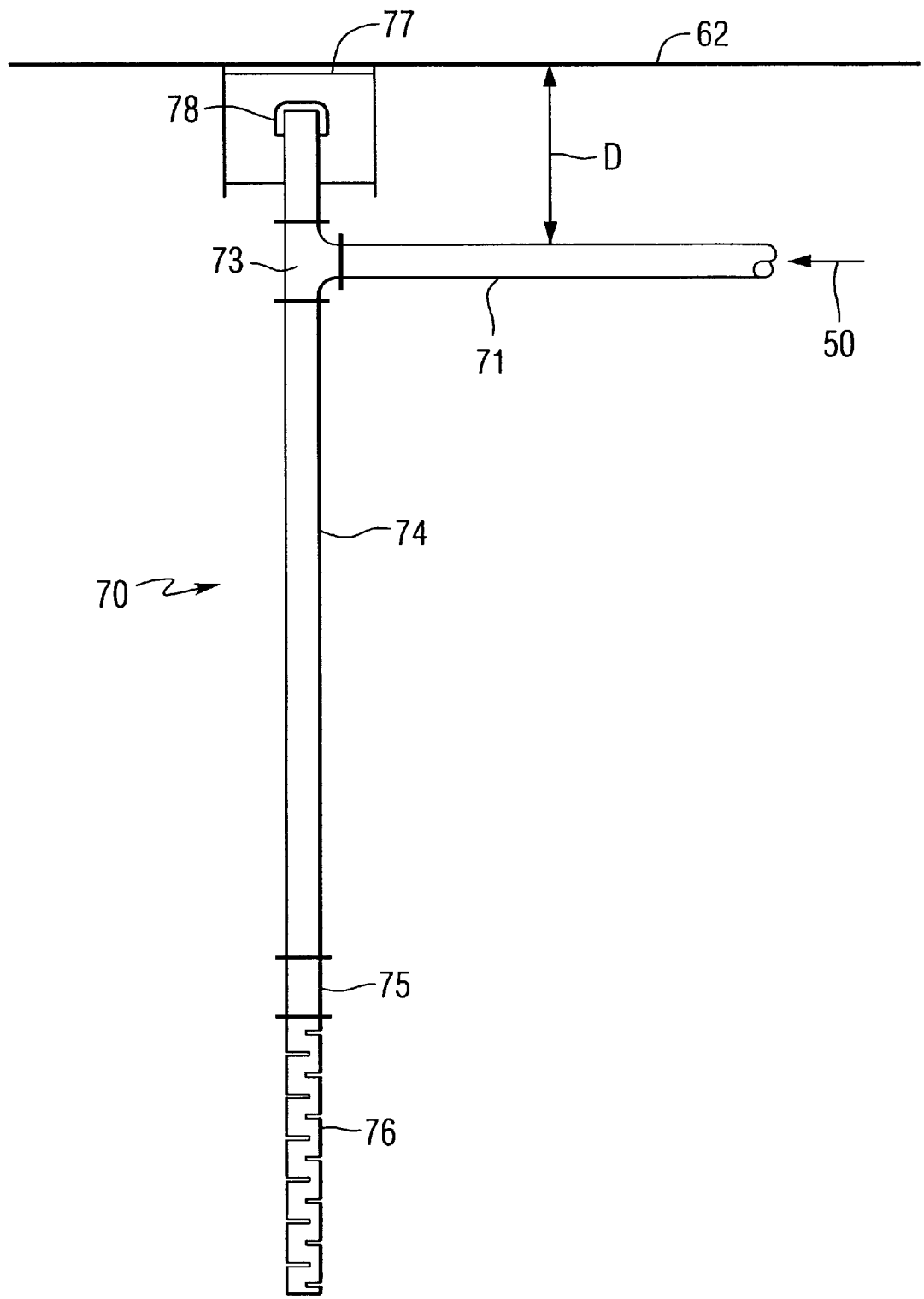
FIG. 4 is a partially schematic illustration of an air injection well which may be used for reducing or eliminating fouling of injection or recovery wells in accordance with an embodiment of the present invention.

FIG. 4 illustrates an air injection well 70 that may be used to prevent fouling in accordance with an embodiment of the present invention. The air injection well line 50 shown in FIG. 2 is connected to a horizontal pipe 71 of the air injection well 70. The horizontal pipe 71 is located a distance D below the finish grade 62, which is preferably at least 3 feet. A tee joint 73 connects the horizontal pipe 71 to a vertical pipe 74. For example, the tee joint 73 may have outside dimensions of 2 inch by 2 inch by 2 inch. The vertical pipe 74 may have any suitable diameter and length. For example, the vertical pipe 74 may comprise a 2 inch outside diameter PVC pipe having a length of from about 1 to about 100 or 500 feet or more, depending upon the desired depth of the air injection well 70. A fitting 75 connects the distal end of the vertical pipe 74 to a well screen 76. The fitting 75 may, for example, comprise a 2 inch by 2 inch coupler fitting. The well screen 76 may be of any suitable construction which adequately allows dispersion of air or other oxygen-containing gases into the treatment zone. For example, the well screen 76 may comprise a slotted PVC tube having an inside diameter of 2 inches and a length of 2 feet. Air or another oxygen-containing gas supplied from the air injection well line 50 to the air injection well 70 is dispersed via the well screen 46 at the desired location within the contaminated site. A road box 77 including a cap 78 is connected to the tee joint 73 in order to protect the top of the well 70 and to allow access to the well 70 for sampling purposes. In addition, the road box 77 allows access to the well 70 for manual or automatic addition of non-indigenous bacteria and/or bacterial nutrients such as nitrogen-containing compounds and phosphorous-containing compounds, if desired.

Although the butane injection well 60 and the air injection well 70 shown in FIGS. 3 and 4 are separate from each other, both butane and air could be supplied through the same injection well. Although two butane injection well lines 30 and 31 and two air injection well lines 50 and 51 are shown in FIGS. 1 and 2, single lines or any suitable number of multiple injection well lines may be used. In addition, the lines may be connected to the butane and air injection wells by any suitable manifold system.

The following example illustrates various aspects of the present invention, and is not intended to limit the scope of the invention.

Figure 5:
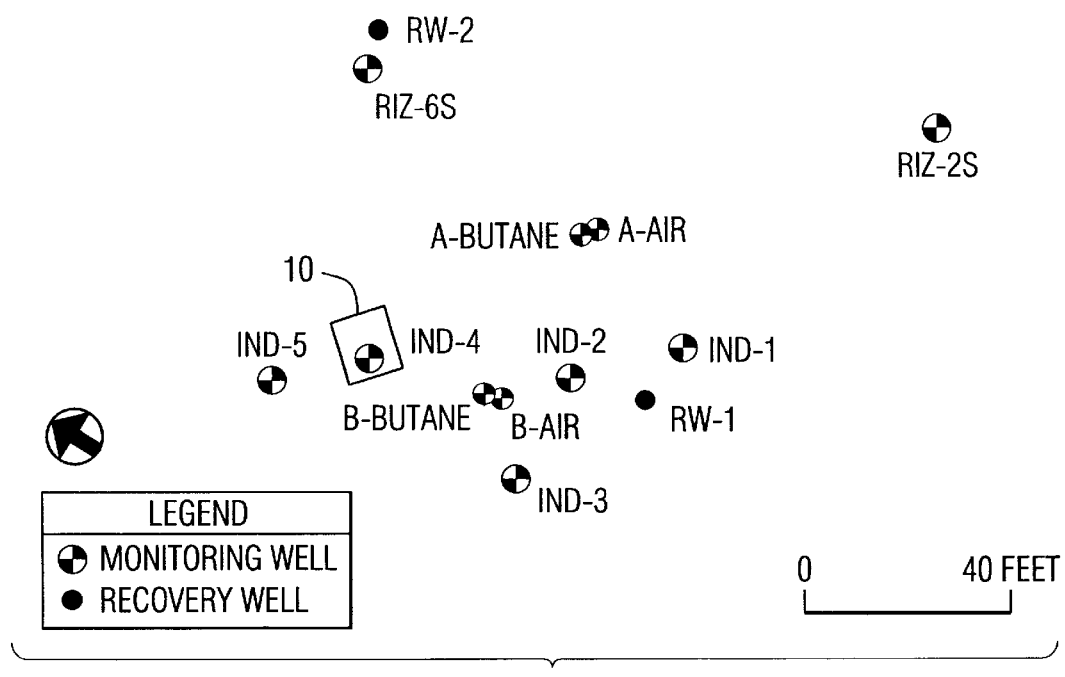
FIG. 5 is a plan view of a hazardous waste site contaminated with 1,1,1-TCA which was treated with an in-situ bioremediation system, and which exhibited reduced recovery well fouling in accordance with an embodiment of the present invention.
Figure 6:
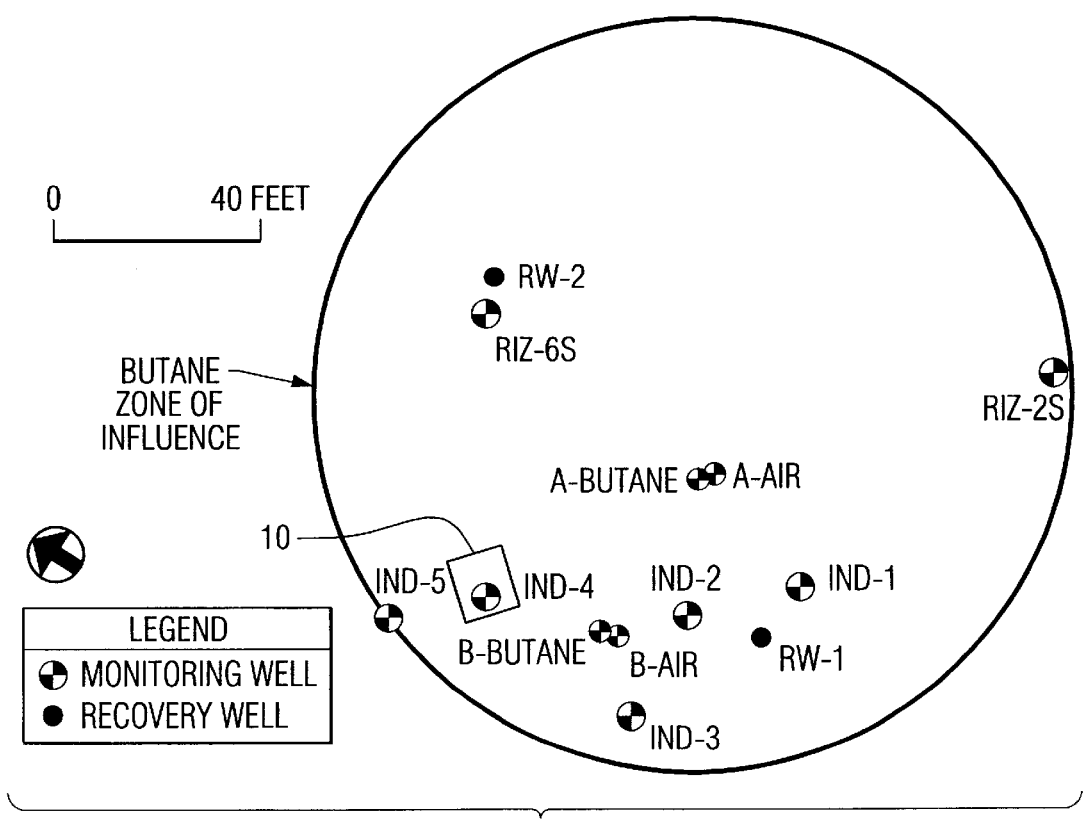
FIG. 6 is a plan view of the site shown in FIG. 5, illustrating a zone of butane influence in accordance with an embodiment of the present invention.
Figure 7:
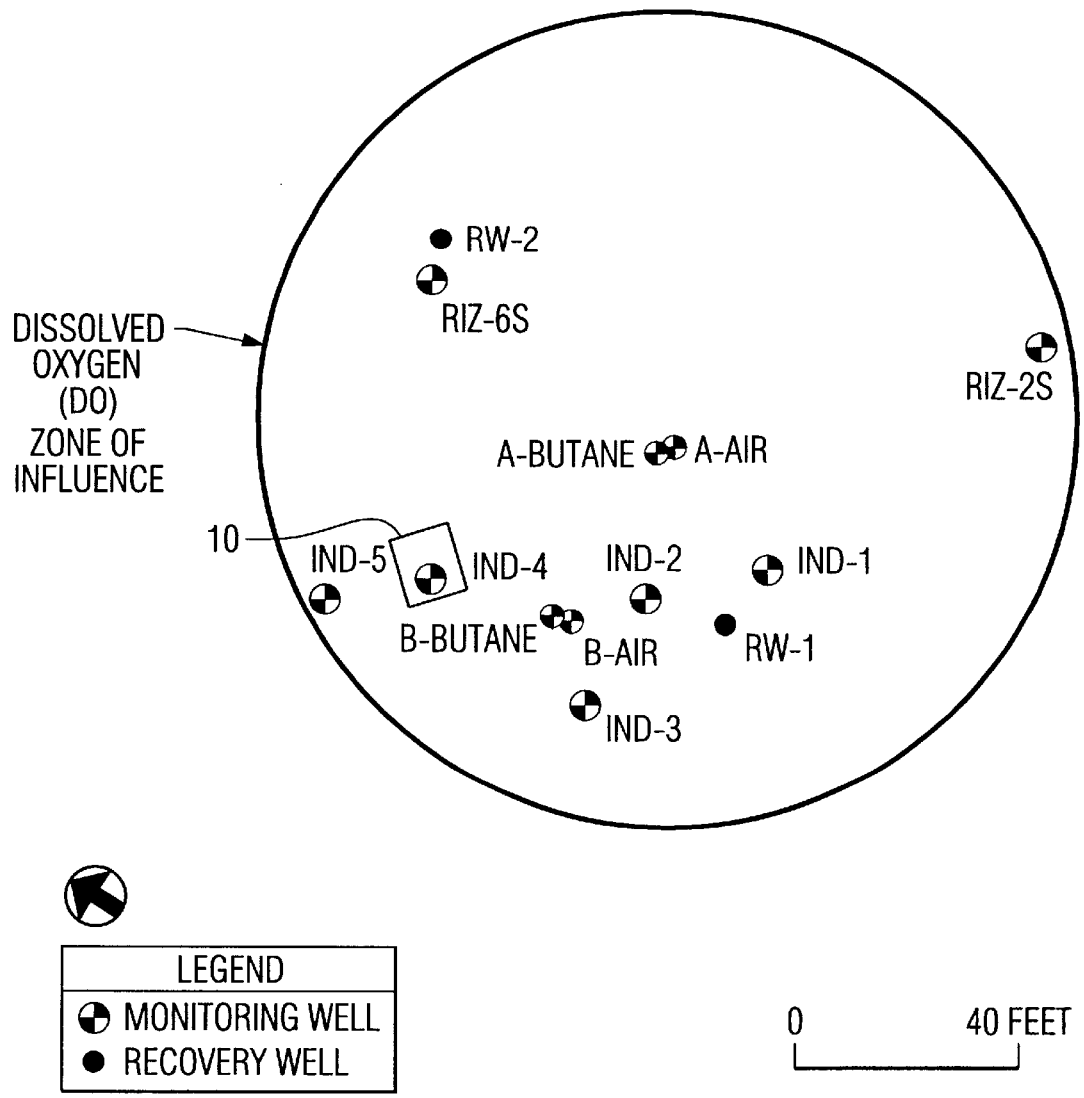
FIG. 7 is a plan view of the site shown in FIG. 5, illustrating a zone of dissolved oxygen influence in accordance with an embodiment of the present invention.

A subsurface investigation was performed at a hazardous waste site in Massachusetts. A plan view of the site is shown in FIG. 5. The investigation indicated the presence of high concentrations of chlorinated volatile organic compounds (VOCs) in the soil and, to a greater extent, in the groundwater. Further assessment indicated the presence of chlorinated VOCs in the shallow aquifer. The soils and groundwater at the site had elevated concentrations of 1,1,1-TCA at dissolved-phase concentrations up to 900 mg/L. Given the extent of VOC contamination at the site, mass excavation and disposal was not deemed an acceptable remediation option. A conventional groundwater pump and treat (GP&T) system using standard air-stripping and granular activated carbon technology was initially installed at the site. This system included three recovery wells screened in the shallow aquifer in the vicinity of the highest VOC concentrations encountered during the subsurface investigations. Periodic groundwater quality monitoring revealed that the groundwater pump and treat system was having a limited impact on groundwater conditions in the shallow aquifer, and 1,1,1-TCA concentrations remained at levels above approximately 150,000 ppb at a particular monitoring well located near the source of the contamination. In an effort to accelerate remediation of the VOC plume identified at the site, an in-situ bioremediation system was installed.

An eighteen month in-situ field demonstration was conducted at the hazardous waste site shown in FIG. 5. Butane was injected into the subsurface using a gas delivery system of the present invention, as illustrated in FIGS. 1–4. Monitoring for fugitive butane emissions was performed daily by automated instrumentation. Butane gas was pulsed into the subsurface at a rate that resulted in full microbial oxidation within the groundwater, capillary fringe and vadose zones. The total dissolved-phase concentrations of 1,1,1-TCA in a single monitoring well located within the biotreatment zone was 150,000 ppb shortly after the biotreatment began, 2,500 ppb eight months after the treatment began, and 580 ppb fourteen months after the biotreatment began. Pilot testing of this technology has shown that chloride ion and carbon dioxide concentrations and cell densities (in groundwater) increased by several orders of magnitude over background in the butane biostimulation zone.

The vapor pressure of butane is normally about 16 psi. As the ambient temperature drops to 40° F., the pressure inside a butane cylinder drops to a vacuum (negative). Therefore, an injection system was designed that would operate in extreme conditions of heat and cold while effectively and safely injecting butane into targeted areas in the subsurface. This was accomplished by pressurizing the butane cylinder with a helium feed through a dual port valve. The helium maintains a constant pressure (e.g., 50 psi) inside the butane cylinder. An internal dip tube located within the butane cylinder insured that the helium only pushed liquid butane out of the tank. Alternatively, the butane cylinder could be heated to a sufficient temperature to feed gaseous butane from the cylinder.

The electrical requirement for the system was a 120-V outlet to operate two digital timers (NEMA-4 and explosion proof) and two electric solenoid valves (NEMA-4 and explosion proof) that regulated the introduction of the cometabolic butane substrate into the VOC-impacted areas. Liquid butane was injected each hour from a 120-pound cylinder for 0.5 seconds using a helium pusher set at 50 psi for a total of approximately 24 cubic feet per day. Oxygen in the form of air was supplied by a five-horsepower rotary-vane air compressor (220-V). The system components, including the air compressor, butane and helium cylinders, injection system timers and valves, and ancillary equipment were located in a storage shed, as illustrated in FIGS. 1 and 2. The storage shed was equipped with a Lower Explosive Limit (LEL) monitor.

A hollow-stem-auger drill rig was used to install the two butane injection wells as shown in FIG. 3 about 20 feet below the surface of the ground. The butane injection wells comprised 1¼ inch outside diameter black iron pipe fitted with a 2-foot slotted stainless steel well point, advanced from the ground surface to a depth above the silt layer. Clean sand was placed around and up to two feet above the top of the well point, with a grout seal placed form the top of the sand pack to the ground surface using a tremie pipe, thus sealing the borehole and preventing short-circuits to the surface via the well annular space.

Each butane injection well was programmed to deliver two pounds of liquid butane into the subsurface daily. Butane was pulsed for a period of 0.5 seconds every hour utilizing helium as a pusher gas (approximately 24 ft$^3$ total of butane gas per day).

Butane injection at each well was controlled by a digital timer/intervalometer (NEMA-4 and explosion proof). Both timers operated on a GFCI circuit. The digital timers operated normally closed electric solenoid valves (one per well) designed for operation with flammable gases and liquids (NEMA-4 and explosion proof). The timers were programmed to open the solenoid valves for 0.5 seconds every hour to regulate the introduction of the cometabolic butane substrate into the VOC-impacted areas. Both solenoid valves operated on a GFCI circuit.

The butane injection system was equipped with an automatic flow sensor programmed to interrupt the power supply to the solenoid timers if a sudden release of butane gas was detected anywhere within the system in excess of two seconds. The de-energized solenoid valves returned to a normally closed position.

The two air injection wells, as illustrated in FIG. 4, were installed using a hollow-stem auger drill rig to a depth of about 20 feet. The air injection wells were constructed of two-inch inside-diameter schedule 40 PVC slotted well screens two feet long. Filter sand was placed in the annular space around the well screen to approximately two feet above the screen/riser interface. The two-foot well screen was installed at a depth above the silt layer in close proximity to a butane injection well with sand pack placed two feet above the top of the screened interval and grout seal placed form the top of the sand pack to the ground surface. The ground was placed in the annular space using a tremie pipe. A watertight road box was cemented flush to the ground surface over each well.

Each air injection well was equipped with a pressure gauge to monitor the injection pressure at each well point. The air compressor was set to deliver 5 to 10 cfm per well at less than one breakout pressure in order to minimize VOC volatilization.

Periodic monitoring at the site consisted of in-situ measurement of dissolved oxygen, carbon dioxide and chloride ion concentration using colorimetric methods. Dissolved butane concentrations were quantified using a portable gas chromatograph. Serial dilutions and plating were conducted to enumerate viable cell counts in groundwater. Monitoring for fugitive butane emissions was conducted daily during the pilot study, and no evidence of breakthrough to the ambient air or other potential receptors was noted during the field study. Groundwater quality samples collected from the on-site monitoring wells were analyzed at a certified laboratory for VOCs referencing EPA method 8260.

Prior to the above-noted in-situ field study, dissolved iron at the site caused fouling of the recovery wells and monitoring well screens. Such iron fouling is a common problem for most water supply and production wells. The dissolved iron concentration in the groundwater at the site was initially approximately 55 to 60 ppm. However, after operating for eighteen months, the butane injection wells showed no indication of fouling at the well screens. In addition, a shallow recovery well at the site which previously required frequent treatment to clean iron precipitation, no longer became clogged after implementation of the butane sparging program. Since implementation of the study, the fouling, e.g., dissolved metals precipitation, was no longer a problem at the site in the butane biotreatment zone. The dissolved iron concentration around the butane injection wells dropped to 2 to 5 ppm.

The data in Table 1 summarizes the analytical data acquired at the site during the field study. Monitoring wells IND-1, IND-2 and IND-3 were inside the biotreatment zone. Monitoring well RIZ-21S served as a control outside the butane biotreatment zone. Analytical testing of the iron concentration was conducted using Chemetrics titration cells, calorimetric analysis.

TABLE 1

| Monitoring Well Locations | Iron Concentration Prior to Butane Injection | Iron Concentration After 8 Months of Butane Injection |
|---|---|---|
| IND-1 | 55 ppm | 2.0 ppm |
| IND-2 | 58 ppm | 3.5 ppm |
| IND-3 | 57 ppm | 5.0 ppm |
| RIZ-21S | 55 ppm | 50 ppm |

While not intending to be bound by any particular theory, butane oxidation may not only cometabolize chlorinated solvents, but may also be used to oxidize metals which would otherwise promote fouling. Butane injection in accordance with the present invention is a simple and cost effective treatment system to abate or prevent metal fouling at wellheads and other industrial applications by, e.g., oxidizing dissolved metal concentrations and immobilizing them from the production and supply routes.

In an embodiment of the present invention, in-situ injection wells for the bioremediation of trichloroethene (TCE) and trichbroethane (TCA) pollutants as disclosed in U.S. patent application Ser. No. 09/275,320 may be prevented from fouling in accordance with the method and apparatus of the present invention. It has been discovered that butane-utilizing bacteria which are extremely effective at degrading pollutants such as low molecular weight halogenated aliphatic hydrocarbons including TCE and TCA, may also be used to reduce or eliminate fouling of injection and recovery wells. In accordance with an embodiment of the present invention, the same in-situ injection wells may be used for both bioremediation of pollutants and reducing fouling of the in-situ injection wells themselves, as well as other injection and/or recovery wells in the treatment zone. Alternatively, different injection wells may be provided for bioremediation and anti-fouling.

The present system may also be used to prevent fouling of in-situ injection wells for remediating methyl tertiary butyl ether (MTBE) pollutants, as described in U.S. patent application Ser. No. 09/275,840, which is incorporated herein by reference.

The present system may further be used to prevent fouling of in-situ injection wells for remediating polychlorinated biphenyl (PCB) pollutants, as described in U.S. patent application Ser. No. 09/275,324, which is incorporated herein by reference.

In addition, the present system may be used to prevent fouling of in-situ injection wells for remediating petroleum pollutants, as described in U.S. patent application Ser. No. 091275,381, which is incorporated herein by reference.

Figure 8:
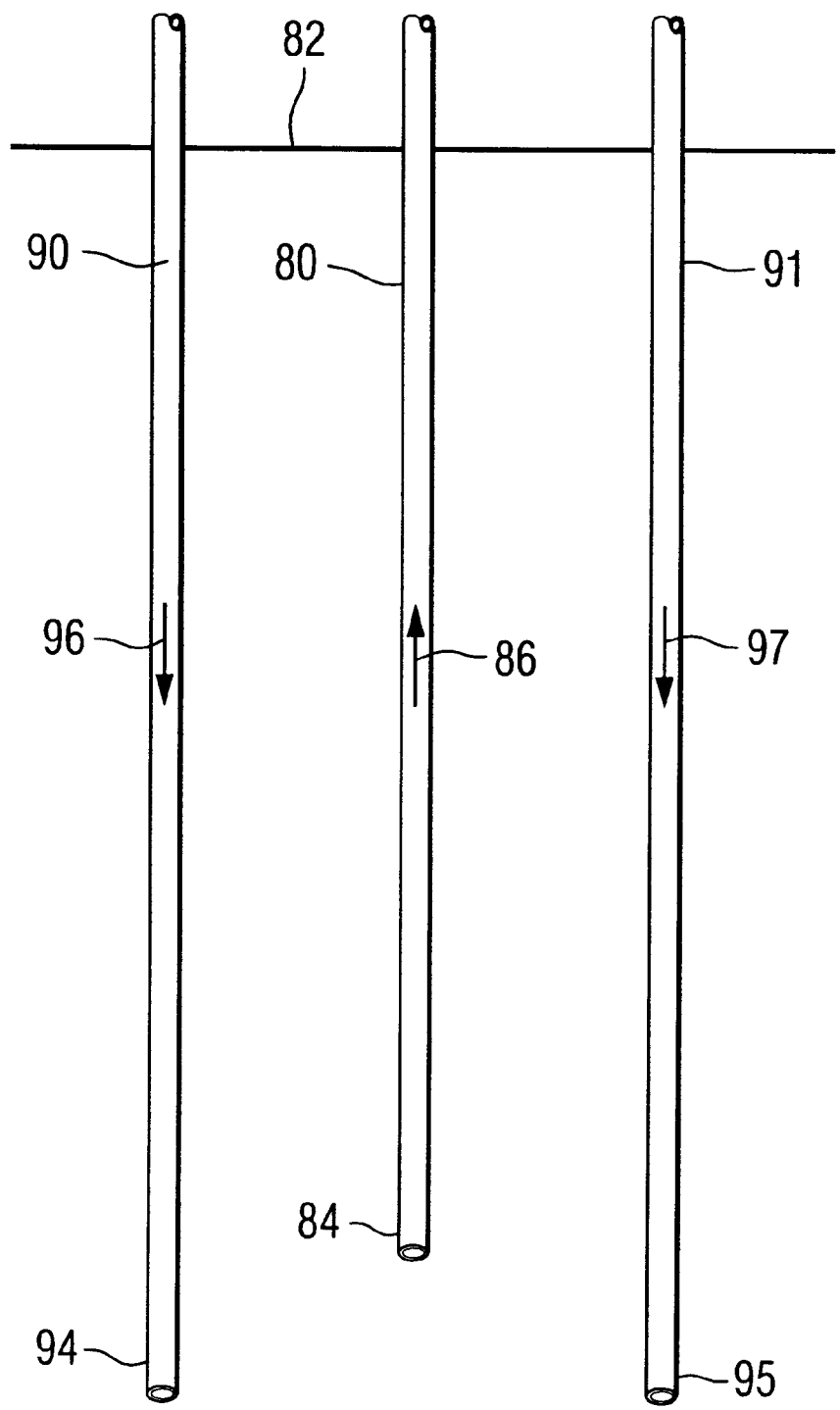
FIG. 8 is a schematic illustration of a recovery well and adjacent alkane/oxygen injection wells for reducing fouling of the recovery well in accordance with an embodiment of the present invention.

FIG. 8 schematically illustrates an anti-fouling system in accordance with an embodiment of the present invention. A recovery well 80 extends from a surface 82 to a distal inlet end 84. A recovered fluid 86 travels from the distal end 84 of the recovery well 80 through the surface 82. The surface 82 may be, for example, a ground surface or a water surface such as an ocean, lake, etc. The recovered fluid 86 may be in the form of a liquid, gas, fluidized solid or the like. For example, the recovered liquid 86 may be groundwater, wastewater, oil, a mixture of oil and water, or the like.

As shown in FIG. 8, in order to reduce fouling at the inlet end 84 of the recovery well 80, alkane/oxygen injection wells 90 and 91 are provided. The injection well 90 includes a distal bullet end 94, while the injection well 91 includes a distal outlet end 95. An injection fluid 96 travels through the injection well 90, while an injection fluid 97 travels through the injection well 91. The injection fluids 96 and 97 may each comprise a mixture of alkanes and oxygen-containing gas in accordance with an embodiment of the present invention. Alternatively, the injection fluid 96 may be the alkane substrate while the injection fluid 97 may be the oxygen-containing gas, or vice versa. The flow of the alkane substrate and/or oxygen-containing gas through the injection well 90 may be continuous or discontinuous, e.g., pulsed. The alkane substrate and oxygen-containing gas supplied from the outlet ends 94 and 95 of the injection wells 90 and 91 stimulate growth of alkane-utilizing bacteria in a zone around the inlet end 84 of the recovery well 80, to thereby reduce fouling of the well. For example, where the recovered fluid 86 is groundwater, injection of a butane substrate and an oxygen-containing gas via the injection wells 90 and 91 may be used to reduce the deposition of fouling material on the inlet end 84 of the recovery well 80.

Figure 9:
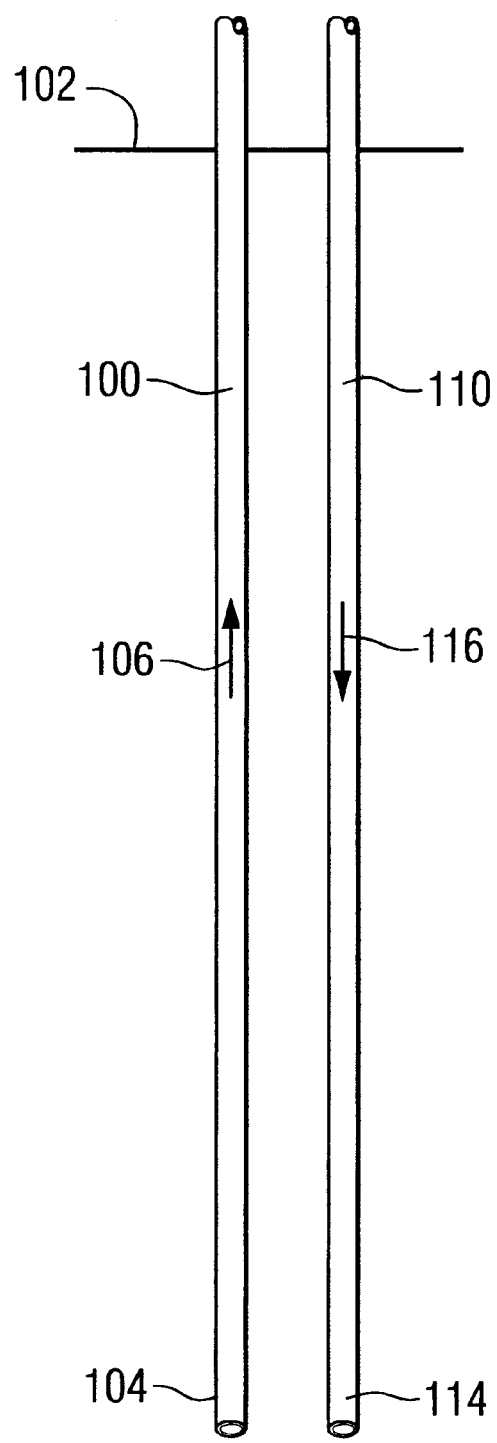
FIG. 9 is a schematic illustration of a recovery well and an adjacent alkane/oxygen injection well in accordance with an embodiment of the present invention.

FIG. 9 schematically illustrates the treatment of a recovery well in accordance with another embodiment of the present invention. A recovery well 100 extends from a surface 102 to a distal inlet end 104. The surface 102 may be, for example, a ground surface or a water surface such as an ocean, lake, etc. A recovered fluid 106 such as oil, groundwater, a mixture of oil and water, etc. travels from the inlet end 104 through the recovery well 100. An alkane/oxygen injection well 110 is located adjacent to the recovery well 100. The injection well 110 includes an outlet end 114 through which an alkane/oxygen fluid 116 passes. The fluid 116 preferably comprises a butane substrate and oxygen-containing gas. The butane substrate and oxygen-containing gas may be supplied as a mixture through the injection well 110, or may be supplied separately. The flow of the butane substrate and/or oxygen-containing gas through the injection well 110 may be continuous or discontinuous, e.g., pulsed. As a particular example, the recovery well 100 may be an oil recovery well with a well head located at the distal end 104 thereof. In this case, the alkane/oxygen fluid 116, e.g., butane substrate and oxygen-containing gas, are injected near the distal end 104 of the recovery well 100 in order to reduce fouling of the oil well head.

Figure 10:
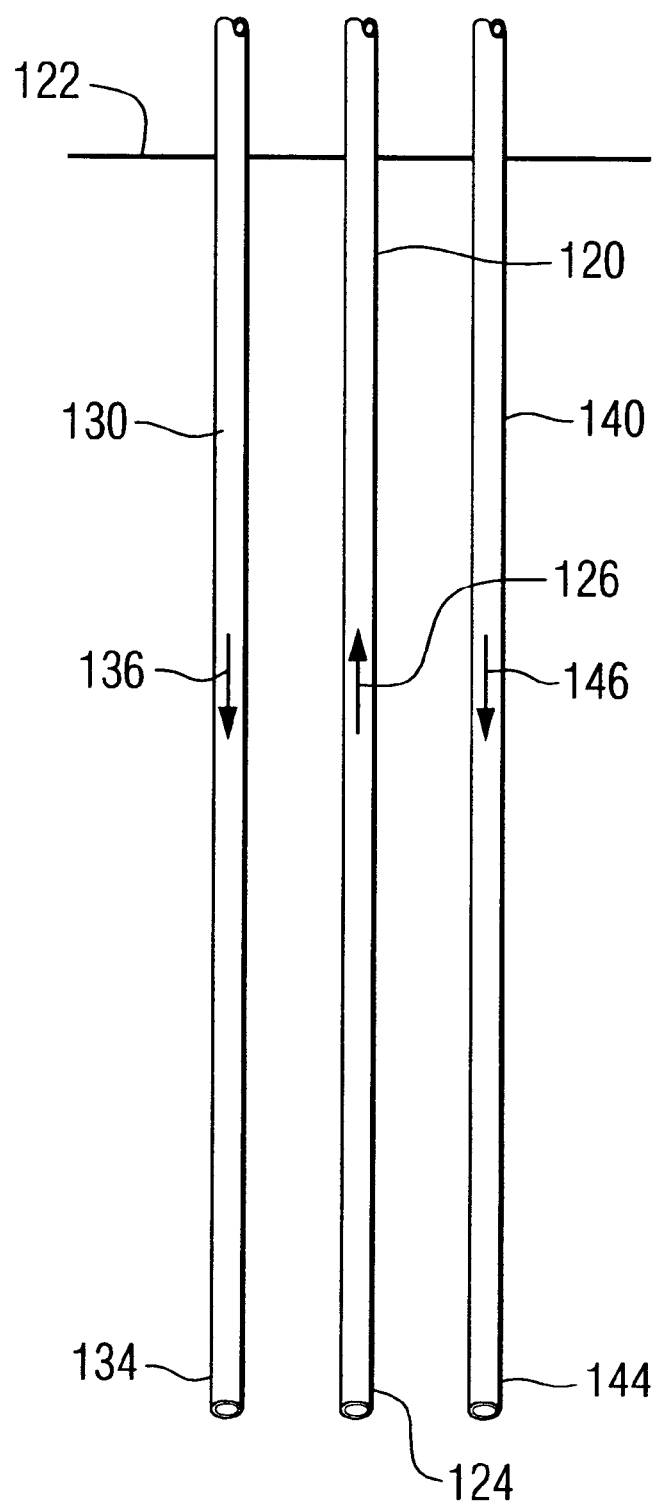
FIG. 10 is a schematic illustration of a recovery well, a pressurized fluid injection well, and an alkane/oxygen injection well for reducing fouling of the recovery well and pressurized fluid well in accordance with an embodiment of the present invention.

FIG. 10 schematically illustrates another alkane/oxygen treatment system of the present invention. A recovery well 120 extends from a surface 122 to a distal inlet end 124. The surface 122 may be, for example, a ground surface or a water surface such as an ocean, lake, etc. A recovered fluid 126 travels from the inlet 124 through the recovery well 120. A pressurized fluid injection well 130 extends from the surface 122 to a distal outlet end 134 which is located in proximity to the inlet end 124 of the recovery well 120. A pressurized fluid 136 flows through the injection well 130. The pressurized fluid 136 may comprise a liquid and/or gas, such as water, sea water, air, natural gas or the like. Although the pressurized fluid injection well 130 shown in FIG. extends from the surface 122, a submerged pump (not shown) could alternatively be used to supply the pressurized fluid 136, e.g., sea water, to the zone surrounding the inlet end 124 of the recovery well 120.

As shown in FIG. 10, in order to reduce fouling at the inlet end 124 of the recovery well 120, an alkane/oxygen injection well 140 is provided. Although a single alkane/oxygen injection well 140 is shown in FIG. 10, multiple injection wells may be used. The injection well 140 includes a distal outlet end 144 located in proximity to the inlet end 124 of the recovery well 120. An alkane/oxygen fluid 146 travels through the injection well 140. The alkane/oxygen fluid 146 preferably comprises a butane substrate and an oxygen-containing gas. The butane substrate and oxygen-containing gas may be supplied as a mixture through the injection well 140, or may be supplied separately. The flow of the butane substrate and/or oxygen-containing gas through the injection well 140 may be continuous or discontinuous, e.g., pulsed. In accordance with the present invention, the alkane/oxygen fluid 146 stimulates the growth of alkane-utilizing bacteria in a zone surrounding the inlet end 24 of the recovery well 20 and the outlet end 134 of the pressurized fluid injection well 130. Such alkane-utilizing bacteria, e.g., butane-utilizing bacteria, effectively reduce fouling of the recovery well 120 and pressurized fluid injection well 130.

In accordance with an embodiment of the present invention, a system as schematically illustrated in FIG. 10 may be used to reduce fouling of oil recovery wells. In many oil drilling operations, sea water is pumped to a zone near the inlet end of the oil recovery well. During such oil recovery operations, the inlet end of the oil recovery well becomes fouled. In addition, the outlet end of the sea water injection system may also be fouled. By providing at least one alkane/oxygen injection well near the oil well head, fouling of the inlet end of the oil recovery well and outlet end of the pressurized sea water injection well may be reduced substantially. As a result, oil production rates may be increased significantly.

One major application for anti-fouling technology is the petroleum industry. Most of the U.S. oil wells are currently in secondary recovery, that is, the oil no longer flows up a recovery well under natural pressure and energy. It is the energy in natural gas and/or salt water occurring under high pressures with the oil that furnishes the requisite energy to displace the oil in the subsurface into the recovery or production wells. Currently, oil production includes the recovery of oil and salt water through forced pumping activities or artificial lift methods. The salt water is separated from the recovered oil and is re-injected into the oil-bearing formation through a series of injection wells. The re-injected salt water also assists in pushing or herding oil remaining in the subsurface toward recovery wells where it is then pumped back to the surface through the forced pumping activities.

When the water is re-injected, increased fouling is observed at the injection wells screens probably due to the growth of iron and manganese oxidizing bacteria and associated oxide and hydroxide incrustations.

Figure 11:
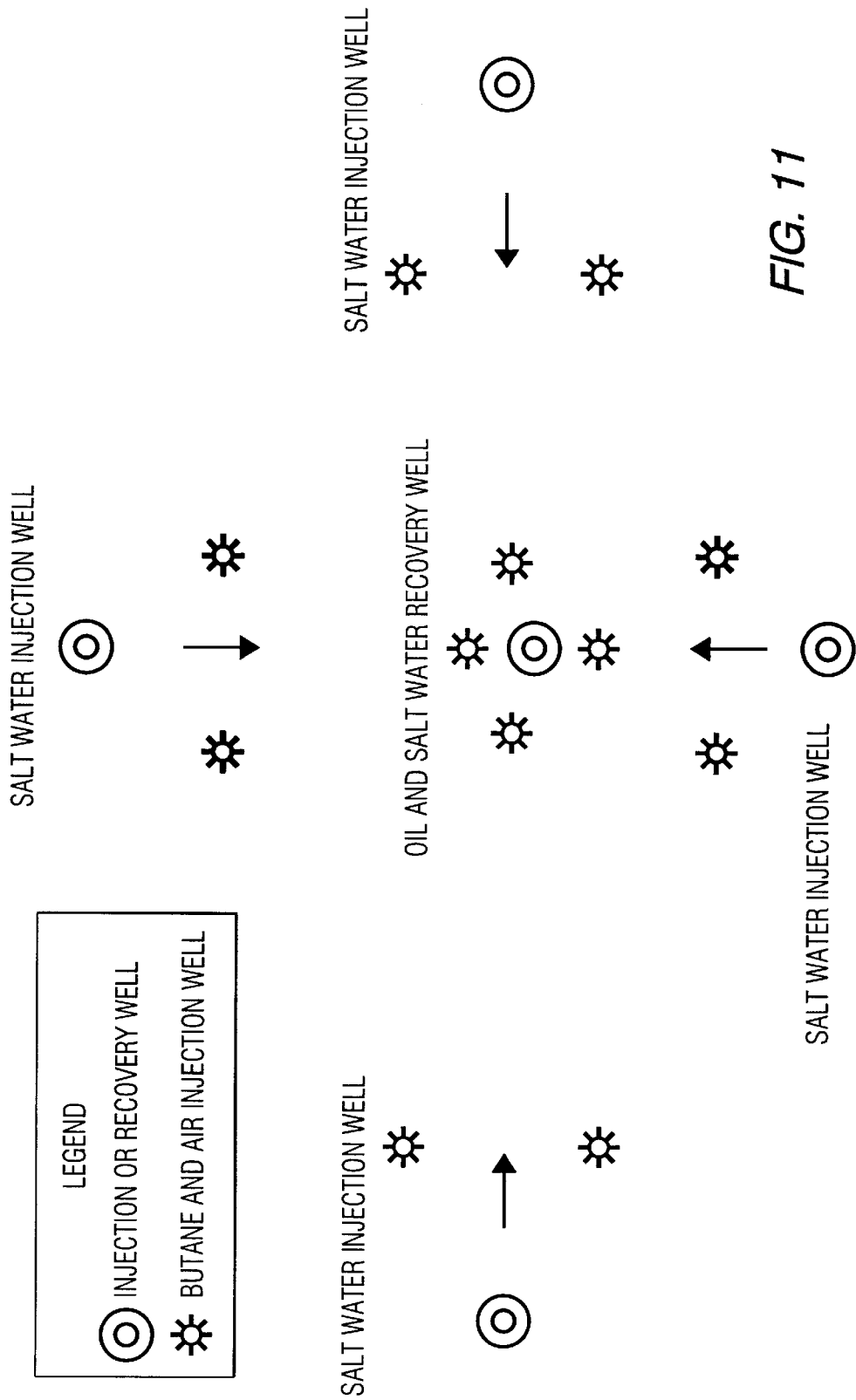
FIG. 11 is a schematic plan view of an oil recovery well, water injection wells, and butane/air injection wells for reducing fouling of the oil recovery well and water injection wells in accordance with an embodiment of the invention.

FIG. 11 is a schematic plan view depicting a method of reducing the fouling observed at salt water injection wells and oil recovery wells. If a series of butane and air injection wells are installed in strategic positions around the injection and recovery wells, the activities of butane-oxidizing bacteria enhance iron and manganese oxidation within the oil-bearing reservoir and in the salt water. Since butane has the highest solubility of any of the gaseous hydrocarbons, butane enrichment enhances microbial activity by increasing substrate availability. By oxidizing the metals, lower concentrations of dissolved metals will be available for transport through the reservoir to the recovery wells where it is then pumped to the surface. By progressively lowering the iron and manganese concentrations in the recovered salt water, fouling at the injection and recovery well screens will diminish over time.

The butane-utilizing bacteria used in accordance with a preferred embodiment of the present invention preferably produce oxygenase enzymes and are capable of metabolizing butane. The operative enzymes may include extracellular enzymes, intracellular enzymes and cell-bound enzymes. The butane-utilizing bacteria typically produce butane monooxygenase and/or butane dioxygenase enzymes.

The butane-utilizing bacteria may contain gram negative and gram positive aerobic rods and cocci, facultative anaerobic gram negative rods, non-photosynthetic, non-fruiting gliding bacteria and irregular non-sporing gram positive rods.

Of the Pseudomonadaceae family comprising gram-negative aerobic rods and cocci, species of the following genera may be suitable: Pseudomonas; Variovorax; Chryseobacterium; Comamonas; Acidovorax; Stenotrophomonas; Sphingobacterium; Xanthomonas; Frateuria; Zoogloea; Alcaligenes; Flavobacterium; Derxia; Lampropedia; Brucella; Xanthobacter; Thermus; Thennomicrobium; Halomonas; Alteromonas; Serpens; Janthinobacterium; Bordetella; Paracoccus; Beijerinckia; and Francisella.

Of the *Nocardioform Actinomycetes* family comprising gram-positive Eubacteria and Actinomycetes, the following genera may be suitable: Nocardia; Rhodococcus; Gordona; Nocardioides; Saccharopolyspora; Micropolyspora; Promicromonospora; Intrasporangium; Pseudonocardia; and Oerskovia.

Of the Micrococcaceae family comprising gram-positive cocci, the following genera may be suitable: Micrococcus; Stomatococcus; Planococcus; Staphylococcus; Aerococcus; Peptococcus; Peptostreptococcus; Coprococcus; Gemella; Pediococcus; Leuconostoc; Ruminococcus; Sarcina; and Streptococcus.

Of the Vibrionaceae family comprising facultative anaerobic gram-negative rods, the following genera may be suitable: Aeromonas; Photobacterium; Vibrio; Plesiomonas; Zymomonas; Chromobacterium; Cardiobacterium; Calymmatobacterium; Streptobacillus; Eikenella; and Gardnerella.

Of the Rhizobiaceae family comprising gram-negative aerobic rods and cocci, the following genera may be suitable: Phyllobacterium; Rhizobium; Bradyrhizobium; and Agrobacterium.

Of the Cytophagaceae family comprising non-photosynthetic, gliding bacteria, non-fruiting, the following genera may be suitable: Cytophaga; Flexibacter; Saprospira; Flexithrix; Herpetosiphon; Capnocytophaga; and Sporocytophaga.

Of the Corynebacterium family comprising irregular, non-sporing gram-positive rods, the following genera may be suitable: Aureobacterium; Agromyces; Arachnia; Rothia; Acetobacterium; Actinomyces; Arthrobactera; Arcanobacterium; Lachnospira; Propionibacterium; Eubacterium; Butyrivibria; Brevibacterium; Bifidobacterium; Microbacterium; Caseobacter; and Thermoanaerobacter.

The following isolation techniques were used for obtaining pure and mixed cultures of various methane-, propaneand butane-tilizing bacteria. Enrichment procedures were used to increase bacterial population for a given growth substrate. Soil samples collected from a variety of sites underwent enrichment transfers weekly for a period of one year. The methods and materials used for the enrichment studies are described below.

Soil samples were collected with a stainless-steel hand auger at depths that varied between one to two feet. The soils samples were stored in dedicated glass containers and moistened with sterile deionized/distilled water for transport to the laboratory. The hand auger was decontaminated between sampling locations with three Alconox soap/distilled water rinses. Soil samples used as inocula were collected from the locations summarized in Table 2.

TABLE 2

| Sample Number/Matrix | Sample Location |
|---|---|
| 1/soil | Landfill cell |
| 2/soil | #2 fuel oil impacted soil |
| 3/soil | Landfill cell |
| 4/soil | Gasoline and waste oil impacted soils |
| 5/soil | Shallow freshwater lagoon |
| 6/soil | Salt marsh |
| 7/soil | Industrial outfall |
| 8/soil | #2 fuel oil impacted soil |

Cultures were transferred weekly for a period of one year in liquid media to increase the relative numbers of methane-, propane- and butane-utilizing bacteria. The liquid media was a mineral salts media (MSM) prepared from the following chemicals:

| | |
|---|---|
| $MgSO_4 \cdot 7H_2O$ | 1.0 g; |
| $CaCl_2$ | 0.2 g; |
| $NH_4Cl$ | 0.5 g; |
| $FeCl_3 \cdot 6H_2O$ | 4.0 mg; |
| Trace elements, solution | 0.5 ml; and |
| Distilled water | 900 ml. |

Trace elements solution 0.5 ml; and

A trace elements solution, which provides micronutrients for bacterial growth, was prepared comprising the following ingredients:

| | |
|---|---|
| $ZnCl_2$ | 5.0 mg; |
| $MnCl_2 \cdot 4H_2O$ | 3.0 mg; |
| $H_3BO4$ | 30.0 mg; |
| $NiCl_2 \cdot 6H_2O$ | 2.0 mg; |
| $(NH_4)_6Mo_7O_{24} \cdot 4H_2O$ | 2.25 mg; and |
| Distilled water | 1000 ml. |

The pH of the MSM was adjusted to 6.8 before autoclaving (20 min at 121 degree C) with 20.0 ml of a phosphate buffer solution comprising 3.6 g of $Na_2HPO_4$ and 1.4 g of KH2PO4 in 100 ml of distilled water. After autoclaving the MSM and the buffer solution, another 2.0 ml of the buffer solution was added to the MSM when the temperature of the media reached 60 degree C. The MSM cocktail was completed with the addition of 4.0 mg of casamino acids and 4.0 mg of yeast (Difco) dissolved in 100 ml of distilled water. The nutrient solution was filter sterilized by vacuum filtration through a 0.2 micron filter (Gelman) prior to addition to the MSM.

Prior to the first enrichment transfer, the inocula from the eight sampling locations summarized in Table 2 underwent a series of pre-treatments. The first two pre-treatments were conducted on the original soil materials used as inocula. The last two treatments were applied as MSM alterations during the weekly transfers. The pre-treatments consisted of the following: (1) 30% ethanol saturation rinse followed by a sterile phosphate buffer rinse (ethanol); (2) 60° C. water bath for 15 minutes (heat); (3) no treatment (no-treat); (4) MSM containing 10% aqueous solution of sodium chloride (10% NaCl); and (5) MSM with pH of 2.0 (pH of 2). Treatment Nos. (4) and (5) were employed in an attempt to locate extreme halophiles and acidophiles capable of utilizing hydrocarbons as a growth substrate.

The first enrichment transfers for each sample series were conducted in 72 ml serum bottles (Wheaton) with 20 ml of MSM and 1.0 g of inocula. Subsequent culture transfers (5.0 ml) were conducted with sterilized plastic syringes (B&D). The bottles were capped with red rubber plugs and crimped with aluminum seals (Wheaton). Each sample was handled aseptically and all glassware, materials and supplies were sterilized by autoclaving. Table 3 summarizes the enrichment transfer schedule and the concentration of methane or propane replaced in the headspace of each serum bottle using a dedicated gas tight syringe (Hamilton) with a Fisher Scientific inert sampling valve (on/off lever) to control gas loss from the needle tip between each transfer.

TABLE 3

| Sample No. | Pre-Treatment | Food Source | Sample ID |
|---|---|---|---|
| 1 | ethanol | methane | 1EM |
| 1 | heat | methane | 1HM |
| 1 | no-treat | methane | 1NM |
| 1 | 10% NaCl | methane | 1SM |
| 1 | pH of 2.0 | methane | 1AM |
| 1 | ethanol | propane | 1EP |
| 1 | heat | propane | 1HP |
| 1 | no-treat | propane | 1NP |
| 1 | 10% NaCl | propane | 1SP |
| 1 | pH of 2.0 | propane | 1AP |

The amount of oxygen required for mineralization of methane, propane and butane can be derived from the following equations.

$$CH_4 + 2O_2 = CO_2 + 2H_2O \qquad 2:1$$

$$C_3H_8 + 5O_2 = 3CO_2 + 4H_2O \qquad 5:1$$

$$C_4H_{10} + 6.5O_2 = 4CO2 + 5H_2O \qquad 6.5:1$$

Table 3 summarizes the entire set of enrichment transfers prepared for Sample No. 1. The first sample series did not include a butane treatment. The remaining seven samples were prepared in identical fashion and, in addition, contained a butane treatment series, as shown in Tables 4 through 10. A control (serum bottle with sterilized MSM only) was maintained for each sample series.

All hydrocarbon gases described herein were research grade quality (Scott Specialty Gases). Methane was added at a concentration of 27% (vol/vol), propane at 10% and butane at 6%. After the first six months of enrichment transfers, the concentrations were reduced to 13% for methane and 9% for propane. The concentration of butane remained the same at 6%.

TABLE 4

| Sample No. | Pre-Treatment | Food Source | Sample ID |
|---|---|---|---|
| 2 | ethanol | methane | 2EM |
| 2 | heat | methane | 2HM |
| 2 | no-treat | methane | 2NM |
| 2 | 10% NaCl | methane | 2SM |
| 2 | pH of 2.0 | methane | 2AM |
| 2 | ethanol | propane | 2EP |
| 2 | heat | propane | 2HP |
| 2 | no-treat | propane | 2NP |
| 2 | 10% NaCl | propane | 2SP |
| 2 | pH of 2.0 | propane | 2AP |
| 2 | ethanol | butane | 2EB |
| 2 | heat | butane | 2HB |
| 2 | no-treat | butane | 2NB |
| 2 | 10% NaCl | butane | 2SB |
| 2 | pH of 2.0 | butane | 2AB |

TABLE 5

| Sample No. | Pre-Treatment | Food Source | Sample ID |
|---|---|---|---|
| 3 | ethanol | methane | 3EM |
| 3 | heat | methane | 3HM |
| 3 | no-treat | methane | 3NM |
| 3 | 10% NaCl | methane | 3SM |
| 3 | pH of 2.0 | methane | 3AM |
| 3 | ethanol | propane | 3EP |
| 3 | heat | propane | 3HP |
| 3 | no-treat | propane | 3NP |
| 3 | 10% NaCl | propane | 3SP |
| 3 | pH of 2.0 | propane | 3AP |
| 3 | ethanol | butane | 3EB |
| 3 | heat | butane | 3HB |
| 3 | no-treat | butane | 3NB |
| 3 | 10% NaCl | butane | 3SB |
| 3 | pH of 2.0 | butane | 3AB |

TABLE 6

| Sample No. | Pre-Treatment | Food Source | Sample ID |
|---|---|---|---|
| 4 | ethanol | methane | 4EM |
| 4 | heat | methane | 4HM |
| 4 | no-treat | methane | 4NM |
| 4 | 10% NaCl | methane | 4SM |
| 4 | pH of 2.0 | methane | 4AM |
| 4 | ethanol | propane | 4EP |
| 4 | heat | propane | 4HP |
| 4 | no-treat | propane | 4NP |
| 4 | 10% NaCl | propane | 4SP |
| 4 | pH of 2.0 | propane | 4AP |
| 4 | ethanol | butane | 4EB |
| 4 | heat | butane | 4HB |
| 4 | no-treat | butane | 4NB |
| 4 | 10% NaCl | butane | 4SB |
| 4 | pH of 2.0 | butane | 4AB |

TABLE 7

| Sample No. | Pre-Treatment | Food Source | Sample ID |
|---|---|---|---|
| 5 | ethanol | methane | 5EM |
| 5 | heat | methane | 5HM |
| 5 | no-treat | methane | 5NM |
| 5 | 10% NaCl | methane | 5SM |
| 5 | pH of 2.0 | methane | 5AM |
| 5 | ethanol | propane | 5EP |
| 5 | heat | propane | 5HP |
| 5 | no-treat | propane | 5NP |
| 5 | 10% NaCl | propane | 5SP |
| 5 | pH of 2.0 | propane | 5AP |
| 5 | ethanol | butane | 5EB |
| 5 | heat | butane | 5HB |
| 5 | no-treat | butane | 5NB |
| 5 | 10% NaCl | butane | 5SB |
| 5 | pH of 2.0 | butane | 5AB |

TABLE 8

| Sample No. | Pre-Treatment | Food Source | Sample ID |
|---|---|---|---|
| 6 | ethanol | methane | 6EM |
| 6 | heat | methane | 6HM |
| 6 | no-treat | methane | 6NM |
| 6 | 10% NaCl | methane | 6SM |
| 6 | pH of 2.0 | methane | 6AM |
| 6 | ethanol | propane | 6EP |
| 6 | heat | propane | 6HP |
| 6 | no-treat | propane | 6NP |
| 6 | 10% NaCl | propane | 6SP |
| 6 | pH of 2.0 | propane | 6AP |
| 6 | ethanol | butane | 6EB |
| 6 | heat | butane | 6HB |
| 6 | no-treat | butane | 6NB |
| 6 | 10% NaCl | butane | 6SB |
| 6 | pH of 2.0 | butane | 6AB |

TABLE 9

| Sample No. | Pre-Treatment | Food Source | Sample ID |
|---|---|---|---|
| 7 | ethanol | methane | 7EM |
| 7 | heat | methane | 7HM |
| 7 | no-treat | methane | 7NM |
| 7 | 10% NaCl | methane | 7SM |
| 7 | pH of 2.0 | methane | 7AM |
| 7 | ethanol | propane | 7EP |
| 7 | heat | propane | 7HP |
| 7 | no-treat | propane | 7NP |
| 7 | 10% NaCl | propane | 7SP |
| 7 | pH of 2.0 | propane | 7AP |
| 7 | ethanol | butane | 7EB |
| 7 | heat | butane | 7HB |
| 7 | no-treat | butane | 7NB |
| 7 | 10% NaCl | butane | 7SB |
| 7 | pH of 2.0 | butane | 7AB |

TABLE 10

| Sample No. | Pre-Treatment | Food Source | Sample ID |
|---|---|---|---|
| 8 | ethanol | methane | 8EM |
| 8 | heat | methane | 8HM |
| 8 | no-treat | methane | 8NM |
| 8 | 10% NaCl | methane | 8SM |
| 8 | pH of 2.0 | methane | 8AM |
| 8 | ethanol | propane | 8EP |
| 8 | heat | propane | 8HP |
| 8 | no-treat | propane | 8NP |
| 8 | 10% NaCl | propane | 8SP |
| 8 | pH of 2.0 | propane | 8AP |
| 8 | ethanol | butane | 8EB |
| 8 | heat | butane | 8HB |
| 8 | no-treat | butane | 8NB |
| 8 | 10% NaCl | butane | 8SB |
| 8 | pH of 2.0 | butane | 8AB |

After the first two weeks of enrichment transfers, all liquid suspensions, ion of the 10% NaCl treatments, the 2.0 pH treatments and the controls, significant increase in turbidity.

After conducting the enrichment transfers for 25 weeks, morphological descriptions and direct cell counts were compiled for all isolates. Morphological descriptions of the isolates were compiled using an Olympus BH-2 Phase Contrast Microscope. In addition, a Bright Line Hemacytometer (Fisher Scientific) was used to enumerate densities by the direct count method. Table 11 summarizes the descriptions and cell density enumerations. Serum bottles of sterilized MSM were maintained as controls.

TABLE 11

| Sample ID | Morphology | Enumeration (cells/ml) |
|---|---|---|
| 1EM | cocci | 2.5E8 |
| 1HM | cocci/bacilli | 1.8E8 |
| 1NM | bacilli | 1.3E8 |
| 1SM | cocci | 5.8E6 |
| 1AM | cocci | 3.8E6 |
| 1EP | bacilli | 4.0E6 |
| 1HP | cocci | 1.3E7 |
| 1NP | bacilli | 9.8E6 |
| 1SP | diplococci | 4.0E6 |
| 1AP | bacilli (variable) | 1.5E6 |
| 2EM | cocci/bacilli | 1.2E8 |
| 2HM | cocci/bacilli | 7.3E7 |
| 2NM | streptococci/bacilli | 1.1E8 |
| 2SM | comma-shaped | 6.6E7 |
| 2AM | comma-shaped | 8.3E6 |
| 2EP | bacilli | 1.2E8 |
| 2HP | bacilli/comma-shaped | 1.8E8 |
| 2NP | bacilli (variable) | 1.1E8 |
| 2SP | cocci | 7.0E6 |
| 2AP | cocci | 3.3E6 |
| 2EB | cocci/bacilli | 2.1E8 |
| 2HB | bacilli (variable) | 2.5B8 |
| 2NB | cocci/comma-shaped | 1.9E8 |
| 2SB | bacilli | 2.5E6 |
| 2AB | cocci | 3.0E6 |
| 3EM | cocci/bacilli | 1.4E8 |
| 3HM | cocci | 1.2E8 |
| 3NM | cocci | 5.8E7 |
| 3SM | cocci | 7.5E5 |
| 3AM | cocci | 7.5E5 |
| 3EP | bacilli | 7.8E7 |
| 3HP | bacilli | 3.0E7 |
| 3NP | bacilli | 7.1E7 |
| 3SP | cocci | 1.0E6 |
| 3AP | bacilli | 2.5E5 |
| 3EB | bacilli (variable) | 1.5E8 |
| 3HB | cocci/bacilli | 3.1E7 |
| 3NB | cocci | 3.1E8 |
| 3SB | cocci (irregular) | 1.7E7 |
| 3AB | cocci/bacilli | 2.5E5 |
| 4EM | cocci (variable) | 1.6E8 |
| 4HM | diplococci | 3.1E8 |
| 4NM | cocci | 1.6E8 |
| 4SM | cocci | 1.3E6 |
| 4AM | bacilli | 2.5E5 |
| 4EP | bacilli (variable) | 1.0E8 |
| 4HP | bacilli (variable) | 2.2E8 |
| 4NP | cocci | 1.3E8 |
| 4SP | cocci | 1.5E6 |
| 4AP | cocci/bacilli | 6.5E6 |
| 4EB | bacilli | 3.6E8 |
| 4HB | bacilli (variable) | 4.8E8 |
| 4NB | bacilli | 2.6E8 |
| 4SB | comma-shaped | 1.3E6 |
| 4AB | cocci | 1.0E6 |
| 5EM | cocci (variable) | 1.3E8 |
| 5HM | cocci | 1.4E8 |
| 5NM | cocci | 2.4E8 |
| 5SM | no cells | 0.0 |
| 5AM | no cells | 0.0 |
| 5EP | cocci (variable) | 5.1E7 |
| 5HP | bacilli | 3.2E7 |
| 5NP | streptococci | 2.1E8 |
| 5SP | cocci (variable) | 2.8E6 |
| 5AP | bacilli | 5.0E5 |

TABLE 11-continued

| Sample ID | Morphology | Enumeration (cells/ml) |
|---|---|---|
| 5EB | bacilli | 3.1E8 |
| 5HB | cocci | 3.2E7 |
| 5NB | cocci | 1.6E8 |
| 5SB | bacilli | 1.0E6 |
| 5AB | cocci | 2.5E6 |
| 6EM | bacilli (variable) | 1.7E8 |
| 6HM | cocci | 2.6E8 |
| 6NM | cocci/spirochetes | 1.3E8 |
| 6SM | cocci (variable) | 1.3E6 |
| 6AM | cocci (variable) | 2.0E6 |
| 6EP | bacilli | 2.8E7 |
| 6HP | bacilli | 1.3E8 |
| 6NP | bacilli/spirochetes | 2.0E8 |
| 6SP | cocci (variable) | 3.5E6 |
| 6AP | cocci (variable) | 5.0E5 |
| 6EB | cocci | 3.5E7 |
| 6HB | bacilli | 1.3E8 |
| 6NB | bacilli | 4.8E7 |
| 6SB | cocci | 2.3E6 |
| 6AB | cocci | 3.3E6 |
| 7EM | streptococci | 1.3E8 |
| 7HM | staphylococci | 3.2E7 |
| 7NM | cocci/bacilli | 3.1E8 |
| 7SM | cocci (variable) | 3.0E6 |
| 7AM | cocci (variable) | 4.0E6 |
| 7EP | bacilli | 1.4E8 |
| 7HP | bacilli | 4.1E8 |
| 7NP | bacilli | 3.5E8 |
| 7SP | cocci (variable) | 1.2E7 |
| 7AP | cocci (variable) | 1.5E6 |
| 7EB | bacilli (variable) | 1.6E8 |
| 7HB | bacilli (variable) | 3.9E8 |
| 7NB | bacilli | 4.2E8 |
| 7SB | cocci (variable) | 4.3E6 |
| 7AB | cocci (variable) | 2.8E6 |
| 8EM | cocci | 5.6E7 |
| 8HM | cocci | 6.1E7 |
| 8NM | cocci | 5.7E7 |
| 8SM | cocci (variable) | 5.3E6 |
| 8AM | bacilli | 2.3E6 |
| 8EP | bacilli | 1.4E8 |
| 8RP | cocci | 3.8E8 |
| 8NP | cocci | 2.9E8 |
| 8SP | square-shaped | 6.5E6 |
| 8AP | cocci (variable) | 3.8E6 |
| 8EB | bacilli | 1.3E8 |
| 8HB | bacilli/streptococci | 9.8E7 |
| 8NB | bacilli (variable) | 1.2E8 |
| 8SB | bacilli (variable) | 2.0E6 |
| 8AB | cocci (variable) | 2.8E6 |
| Control-1 | no cells | 0.0 |
| Control-2 | no cells | 0.0 |
| Control-3 | no cells | 0.0 |

Sample ID strains 3NB and 6NB were placed on deposit with the American Type Culture Collection (ATCC), Rockville, Md. on Aug. 22, 1996, under ATCC designation numbers 55808 and 55809, respectively.

As a food source for microbial consumption, butane has been found to be a preferred substrate to methane or propane due to its solubility factor. Methane and propane are characterized as slightly soluble in water, while butane is characterized as very soluble in water. At 17 degrees centigrade, 3.5 ml of methane and 6.5 ml of propane dissolves in 100 ml of water. In contrast, 15 ml of butane dissolves in 100 ml of water. Such higher solubility increases microbial access to the growth substrate for metabolism. Butane is thus approximately four times more soluble in groundwater than methane. In accordance with the present invention, butane injection results in large radii of influence at injection wellheads.

Various propane-utilizing and butane-utilizing bacteria were characterized as follows. Microorganism identification is based on the Similarity Index. The Similarity Index in the Microbial Identification System (MIS) is a numerical value which expresses how closely the fatty acid composition of an unknown sample compares with the mean fatty acid methyl ester composition of the strains used to create the library entry listed as its match. The database search presents the best matches and associated similarity indices. An exact match of the fatty acid make-up of the unknown sample to the mean of a library entry results in a similarity index of 1.000. The similarity index will decrease as each fatty acid varies from the mean percentage. Strains with a similarity of 0.500 or higher and with a separation of 0.100 between first and second choice are good matches (good or excellent). A similarity index between 0.300 and 0.500 may be a good match but would indicate an atypical strain (OK). Values lower than 0.300 suggest that the species is not in the database but those listed provide the most closely related species (weak or poor).

In the cases where a strain remained unidentified after fatty acid analysis, the Biolog system was employed where microorganisms are identified by comparing substrate utilization characteristics of the unknown isolate to the Biolog database.

The following isolates were chosen for identification at two independent laboratories: propane-utilizers 2EP, 3EP, 4HP, 6HP, 6NP and 8NP; and butane-utilizers 2EB, 2HB, 3EB, 3NB, 4EB, 4HB, 4NB, SEB, 6HB, 6NB and 7NB.

The majority of the propane-utilizers and butane-utilizers were characterized as different genera/species by both laboratories for the comparison-pair isolates 2EP–2EB, 3EP–3EB, 4HP–4HB, 6HP–6HB, and 6NP–6NB, thus indicating that the butane-utilizers are a distinct class of microorganism from the propane degraders. Since methane-utilizing bacteria are obligate methane oxidizers, no isolates from the methane microcosms were submitted for laboratory analysis. Most isolates from the microcosms were mixed. Between both laboratories, 59 genus/specie were identified with "good or excellent" precision, 14 with "OK" precision (atypical strains) and 22 with "weak" precision (species not in database and remain as unknowns). A summary of the butane-utilizers that have demonstrated the ability to degrade TCE are identified in Table 12.

TABLE 12

| Sample ID | Genus | Species |
|---|---|---|
| 2HB* | Pseudomonas | putida |
| 2EB | Pseudomonas | rubrisubalbicans |
| 3EB | Pseudomonas | rubrisubalbicans |
| 5EB | Pseudomonas | aeruginosa |
| 6NB | Pseudomonas | aeruginosa |
| 2EB | Variovorax | paradoxus |
| 2HB | Variovorax | paradoxus |
| 3BB | Variovorax | paradoxus |
| 3NB | Variovorax | paradoxus |
| 4HB | Variovorax | paradoxus |
| 4NB | Variovorax | paradoxus |
| 5EB* | Variovorax | paradoxus |
| 6HB | Variovorax | paradoxus |
| 2EB | Variovorax | paradoxus** |
| 6NB | Variovorax | paradoxus*** |
| 7NB | Nocardia | asteroides |
| 2HB | Nocardia | asteroides*** |
| 3BB | Nocardia | asteroides*** |
| 4HB* | Nocardia | asteroides*** |
| 4NB | Nocardia | asteroides*** |
| 7NB | Nocardia | asteroides*** |
| 5EB* | Nocardia | brasiliensis |
| 2EB | Nocardia | restricta |
| 2HB | Nocardia | globerula |
| 2HB | Chryseobacterium | indologenes |
| 4HB | Chryseobacterium | indologenes |
| 7NB | Chryseobacterium | indologenes |
| 5EB | Chryseobacterium | meningosepticum |

TABLE 12-continued

| Sample ID | Genus | Species |
|---|---|---|
| 2EB | Comamonas | acidovorans |
| 3NB | Comamonas | acidovorans |
| 6HB | Comamonas | acidovorans |
| 6NB | Comamonas | acidovorans |
| 4EB | Acidovorax | delafieldii |
| 4NB | Acidovorax | delafieldii |
| 6NB | Acidovorax | delafieldii |
| 4NB | Rhodococcus | rhodochrous |
| 7NB | Rhodococcus | rhodochrous |
| 2EB | Rhodococcus | erythropolis |
| 3EB | Rhodococcus | erythropolis |
| 6H3 | Rhodococcus | erythropolis |
| 4EB* | Rhodococcus | fascians |
| 5EB* | Rhodococcus | fascians |
| 4NB | Aureobacterium | barkeri |
| 4HB | Aureobacterium | esteroaromaticum |
| 4NB | Aureobacterium | esteroaromaticum |
| 6HB | Aureobacterium | saperdae |
| 5EB | Micrococcus | varians |
| 7NB | Micrococcus | varians |
| 7NB | Micrococcus | kristinae |
| 6HB | Aeromonas | caviae |
| 6NB | Aeromonas | caviae |
| 2EB | Stenotrophomonas | maltophilia |
| 3EB | Stenotrophomonas | maltophilia |
| 4EB | Stenotrophomonas | maltophilia |
| 5EB | Stenotrophomonas | maltophilia |
| 6HB | Stenotrophomonas | maltophilia |
| 6NB | Stenotrophomonas | maltophilia |
| 4EB | Sphingobacterium | thalpophilum |
| 4NB* | Sphingobacterium | spiritivorum |
| 4NB | Shewanella | putrefaciens B |
| 3NB* | Phyllobacterium | myrsinacearum |
| 6HB | Clavibacter | michiganense |
| 6HB | Clavibacter | michiganense**** |
| 6NB | Alcaligenes | xylosoxydans |
| 7HB* | Gordona | terrae |
| 7NB | Corynebacterium | aquaticum B |
| 7NB | Cytophaga | johnsonae |

* = low similarity index indicating a poor match with the fatty-acid database. In these cases, the species in the consortia listed was matched to a database testing substrate utilization and remained unidentified. The (*) best describes an unknown genera/species.
** = GC Subgroup A subspecies
*** = GC Subgroup B subspecies
**** = tessellarius subspecies Whereas particular embodiments of this invention have been described above for purposes of illustration, it will be evident to those skilled in the art that numerous variations of the details of the present invention may be made without departing from the invention as defined in the appended claims.

What is claimed is:

1. A method of reducing well fouling comprising:
    stimulating growth of alkane-utilizing bacteria adjacent to the well; and
    reducing deposition of fouling material on the well with the alkane-utilizing bacteria, wherein the fouling material comprises at least one metal oxide.

2. The method of claim 1, wherein the alkane-utilizing bacteria comprise butane-utilizing bacteria.

3. The method of claim 2, wherein the butane-utilizing bacteria comprises at least one bacterium selected from the group consisting of Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

4. The method of claim 2, wherein the butane-utilizing bacteria comprises at least one bacterium selected from the group consisting of putida, rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B and johnsonae.

5. The method of claim 2, wherein the butane-utilizing bacteria comprises at least one bacterium selected from the group consisting of *Pseudomonas rubrisubalbicans, Pseudomonas aeruginosa, Variovorax paradoxus, Nocardia asteroides, Nocardia restricta, Chryseobacterium indologenes, Comamonas acidovorans, Acidovorax delafieldii, Rhodococcus rhodochrous, Rhodococcus erythropolis, Aureobacterium esteroaromaticum, Aureobacterium saperdae, Micrococcus varians, Micrococcus kristinae, Aeromonas caviae, Stenotrophomonas maltophilia, Sphingobacterium thalpophilum, Clavibacter michiganense, Alcaligenes xylosoxydans, Corynebacterium aquaticum B and Cytophaga johnsonae.*

6. The method of claim 1, wherein the fouling material further comprises bacteria.

7. The method of claim 1, wherein the at least one metal oxide is hydrated.

8. The method of claim 1, wherein the at least one metal oxide comprises an oxide of iron, manganese, lead, arsenic, nickel, mercury, molybdenum, cadmium, copper, chromium, silver, zinc, potassium or combinations thereof.

9. The method of claim 1, wherein the at least one metal oxide comprises ferric oxide.

10. The method of claim 1, wherein the well comprises a recovery well.

11. The method of claim 10, wherein the recovery well comprises a water recovery well.

12. The method of claim 10, wherein the recovery well comprises an oil recovery well.

13. The method of claim 1, wherein the well comprises an injection well.

14. The method of claim 13, wherein the injection well comprises an in-situ bioremediation well.

15. A method of reducing well fouling comprising:
introducing at least one alkane and oxygen to a region of the well susceptible to fouling; and
stimulating growth of alkane-utilizing bacteria which reduce deposition of fouling material on the well, wherein the fouling material comprises at least one metal oxide.

16. The method of claim 15, wherein the at least one alkane comprises a butane substrate.

17. The method of claim 16, wherein the butane substrate comprises at least about 10 weight percent butane.

18. The method of claim 16, wherein the butane substrate comprises at least about 50 weight percent butane.

19. The method of claim 16, wherein the butane substrate comprises at least about 90 weight percent butane.

20. The method of claim 16, wherein the butane substrate comprises at least about 99 weight percent n-butane.

21. The method of claim 15, further comprising introducing the at least one alkane to the well continuously.

22. The method of claim 15, further comprising introducing the at least one alkane to the well periodically.

23. The method of claim 15, wherein the oxygen is introduced in the form of an oxygen-containing gas.

24. The method of claim 23, wherein the oxygen-containing gas comprises air.

25. The method of claim 23, further comprising introducing the oxygen-containing gas to the well continuously.

26. The method of claim 23, further comprising introducing the oxygen-containing gas to the well periodically.

27. The method of claim 15, further comprising introducing butane-utilizing bacteria to the well.

28. The method of claim 17, wherein the well comprises a recovery well.

29. The method of claim 28, wherein the recovery well comprises a water recovery well.

30. The method of claim 28, wherein the recovery well comprises an oil recovery well.

31. The method of claim 30, further comprising injecting a pressurized fluid adjacent to the oil recovery well.

32. The method of claim 31, wherein the pressurized fluid comprises water.

33. The method of claim 32, wherein at least a portion of the oxygen is introduced to the well by mixing an oxygen-containing gas with the water.

34. The method of claim 31, wherein the pressurized fluid comprises sea water.

35. The method of claim 15, wherein the well comprises an injection well.

36. The method of claim 35, wherein the injection well comprises an in-situ bioremediation well.

37. Apparatus for reducing well fouling comprising means for stimulating growth of alkane-utilizing bacteria adjacent to the well to thereby reduce deposition of fouling material on the well, wherein the fouling material comprises at least one metal oxide.

38. Apparatus for reducing well fouling comprising:
a source of an alkane substrate;
a source of an oxygen-containing gas; and
at least one injector in flow communication with the source of alkane substrate and the source of oxygen-containing gas having a distal end located in proximity to at least a portion of the well that is susceptible to fouling by a material which comprises at least one metal oxide.

39. A method of reducing oil recovery well fouling comprising:
stimulating growth of alkane-utilizing bacteria adjacent to the oil recovery well; and
reducing deposition of fouling material on the oil recovery well with the alkane-utilizing bacteria.

40. The method of claim 39, wherein the alkane-utilizing bacteria comprise butane-utilizing bacteria.

41. The method of claim 39, wherein the fouling material comprises at least one metal oxide.

42. A method of reducing oil recovery well fouling comprising:
introducing at least one alkane and oxygen to a region of the oil recovery well susceptible to fouling; and
stimulating growth of alkane-utilizing bacteria which reduce deposition of fouling material on the oil recovery well.

43. The method of claim 42, wherein the at least one alkane comprises a butane substrate.

44. The method of claim 42, wherein the fouling material comprises at least one metal oxide.

45. Apparatus for reducing oil recovery well fouling comprising:
a source of an alkane substrate;
a source of an oxygen-containing gas; and
at least one injector in flow communication with the source of alkane substrate and the source of oxygen-containing gas having a distal end located in proximity to at least a portion of the oil recoveir well that is susceptible to fouling.

46. The apparatus of claim 45, wherein the alkane substrate comprises a butae substrate.

47. The apparatus of claim 45, wherein the fouling material comprises at least one metal oxide.

* * * * *

UNITED STATES PATENT AND TRADEMARK OFFICE
CERTIFICATE OF CORRECTION

PATENT NO.     : 6,244,346 B1
DATED          : June 12, 2001
INVENTOR(S)    : Felix Anthony Perriello It is certified that error appears in the above-identified patent and that said Letters Patent is hereby corrected as shown below:

Column 4,
Line 37, "gellike" should read -- gel-like --.

Column 10,
Line 2, "091275,381" should read -- 09/275,381 --.

Column 11,
Line 4, "FIG." should read -- FIG. 10 --.

Column 12,
Line 30, "Thennomicrobium" should read -- Thermo-microbium --.

Column 13,
Line 1, "butane-tilizing" should read -- butane-utilizing --.
Line 39, "elements, solution" should read -- elements solution --.
Line 43, "Trace elements solution 0.5 ml; and" should be deleted.
Line 59, "KH2PO4" should read -- $KH_2PO_4$ --.

Column 14,
Line 10, "(10% NaCI)" should read -- (10% NaCl) --.

Column 16,
Line 65, "ion of the 10% NaCl treatments" should read -- with the exception of the 10% NaCl treatments --.
Line 66, "significant increase in turbidity" should read -- demonstrated a significant increase in turbidity --.

Column 17,
Line 32, "2.5 B8" should read -- 2.5 E8 --.

Column 18,
Line 39, "8RP" should read -- 8HP --.

UNITED STATES PATENT AND TRADEMARK OFFICE
CERTIFICATE OF CORRECTION

PATENT NO. : 6,244,346 B1
DATED : June 12, 2001
INVENTOR(S) : Felix Anthony Perriello It is certified that error appears in the above-identified patent and that said Letters Patent is hereby corrected as shown below:

Column 19,
Line 25, "SEB" should read -- 5EB --.
Lines 50 and 58, "3BB" should read -- 3EB --.

Column 20,
Line 14, "6H3" should read -- 6HB --.

Column 22,
Line 1, "The method of Claim 17" should read -- The method of Claim 15 --.
Line 60, "recoveir" should read -- recover --.
Line 63, "butae" should read -- butane --.

Signed and Sealed this

Twenty-eighth Day of September, 2004

JON W. DUDAS
*Director of the United States Patent and Trademark Office*